(12) United States Patent
Wang et al.

(10) Patent No.: US 12,498,614 B2
(45) Date of Patent: Dec. 16, 2025

(54) OPTICAL SELECTIVE SWITCH AND NODE APPARATUS

(71) Applicant: HUAWEI TECHNOLOGIES CO., LTD., Guangdong (CN)

(72) Inventors: Yong Wang, Shanghai (CN); Tenghao Li, Shenzhen (CN); Hui Xiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 572 days.

(21) Appl. No.: 17/986,720

(22) Filed: Nov. 14, 2022

(65) Prior Publication Data
US 2023/0075373 A1 Mar. 9, 2023

Related U.S. Application Data

(63) Continuation of application No. PCT/CN2021/071277, filed on Jan. 12, 2021.

(30) Foreign Application Priority Data

May 15, 2020 (CN) .......................... 202010415016.4

(51) Int. Cl.
*G02F 1/31* (2006.01)
(52) U.S. Cl.
CPC ........................ *G02F 1/31* (2013.01)
(58) Field of Classification Search
CPC .......................................................... G02F 1/31
See application file for complete search history.

(56) References Cited

U.S. PATENT DOCUMENTS

| 6,636,664 B2 * | 10/2003 | Snyder | G02B 6/3528 |
| | | | 385/115 |
| 2003/0228089 A1 * | 12/2003 | Blackstone | G02B 6/3536 |
| | | | 385/18 |
| 2021/0149118 A1 * | 5/2021 | Xiang | G02B 27/30 |

FOREIGN PATENT DOCUMENTS

CN 1418319 A 5/2003

\* cited by examiner

*Primary Examiner* — Kenneth N Vanderpuye
*Assistant Examiner* — Asif Shameem
(74) *Attorney, Agent, or Firm* — WOMBLE BOND DICKINSON (US) LLP

(57) ABSTRACT

An optical selective switch includes N input ports, M output ports, an input passive deflection element, an input active deflection element, an output passive deflection element, and an output active deflection element. Each input port is configured to receive input light. Each output port is configured to output to-be-output light from the output port. The input passive deflection element is configured to deflect the input light to a direction corresponding to an intermediate output port. The input active deflection element is configured to deflect the input light to a direction corresponding to a target output port based on the deflection of the input passive deflection element. The output passive deflection element is configured to deflect the to-be-output light to the direction corresponding to the intermediate output port. The output active deflection element is configured to deflect the to-be-output light to the target output port.

18 Claims, 16 Drawing Sheets

Direction A

OPTICAL SELECTIVE SWITCH AND NODE APPARATUS

CROSS-REFERENCE TO RELATED APPLICATIONS

This application is a continuation of International Application No. PCT/CN2021/071277, filed on Jan. 12, 2021, which claims priority to Chinese Patent Application No. 202010415016.4, filed on May 15, 2020. The disclosures of the aforementioned applications are hereby incorporated by reference in their entireties.

TECHNICAL FIELD

This application relates to the optical communication field, and in particular, to an optical selective switch and a node apparatus.

BACKGROUND

Optical networks have continuously developed into large-capacity, low-latency, and intelligent networks. An optical network includes an optical network node and an optical channel. The optical channel, for example, an optical fiber, is used to transmit an optical signal. The optical network node is used to add/drop, block, and pass an optical signal of any wavelength. A node apparatus disposed at the optical network node is provided with a wavelength selective switch (WSS).

The WSS is provided with a diffraction grating capable of deflecting incident light to a corresponding emergent direction. However, as a quantity of WSS ports constantly increases, a maximum deflection angle of a light beam emitted from the diffraction grating also constantly increases. As a result, diffraction efficiency during light beam deflection and an isolation between light beams are reduced, and finally an insertion loss and port crosstalk of the WSS are significantly increased.

SUMMARY

Embodiments of this application provide an optical selective switch and a node apparatus, to alleviate a problem that a maximum deflection angle of a light beam emitted from a diffraction grating is relatively large due to an increase in a quantity of WSS ports.

To achieve the foregoing objective, the following technical solutions are used in this application.

According to an aspect of embodiments of this application, an optical selective switch is provided. The optical selective switch includes N input ports, M output ports, an input active deflection element, an input passive deflection element, an output active deflection element, and an output passive deflection element. N is an integer greater than or equal to 3, and M is an integer greater than or equal to 3. Each input port is configured to receive input light. Each output port is configured to output to-be-output light from the output port. The input passive deflection element is configured to deflect the input light to a direction corresponding to an intermediate output port. The input active deflection element is configured to deflect the input light to a direction corresponding to a target output port based on the deflection of the input passive deflection element. The output passive deflection element is configured to deflect the to-be-output light to the direction corresponding to the intermediate output port. The output active deflection element is configured to deflect the to-be-output light to the target output port based on the deflection of the output passive deflection element.

In conclusion, by providing the input passive deflection element and the output passive deflection element in the optical selective switch, some optical signals incident to the input passive deflection element and the output passive deflection element can be deflected to the direction corresponding to the intermediate output port. In this way, angles at which the input active deflection element and the output active deflection element deflect the incident optical signals can be reduced, to increase power of the optical signals received by the output ports, thereby improving diffraction efficiency of the optical selective switch during light beam deflection. In addition, because the angles at which the input active deflection element and the output active deflection element deflect the incident optical signals are reduced, an isolation between optical signals transmitted between different output ports can be increased.

In some embodiments, the N input ports are disposed side by side in a first direction, and the input passive deflection element includes a plurality of first prism structures disposed side by side in the first direction. At least one of the N input ports except an intermediate input port is in a one-to-one correspondence with the first prism structures. The first prism structure is configured to deflect the input light to the direction corresponding to the intermediate output port by a first pretilt angle $\Delta\theta_1$. First pretilt angles $\Delta\theta_1$ of the plurality of first prism structures are gradually reduced in the first direction from an edge of the input passive deflection element to its center. In this way, a difference between a maximum angle at which the input active deflection element deflects an input port at an edge position and a maximum angle at which the input active deflection element deflects an input port at a middle position can be reduced.

In some embodiments, the first prism structure includes a right-angled triangular prism. A cross section of the right-angled triangular prism in a direction perpendicular to a light incident surface of the input active deflection element is a right triangle. There is a wedge angle $\alpha$ between a hypotenuse of the right triangle and the light incident surface of the input active deflection element. An opening direction of the wedge angle $\alpha$ faces toward the center of the input passive deflection element. In this way, after a light beam incident to the first prism structure passes through parts of the hypotenuse, phase distribution of light of different wavelengths in the light beam can change, and further the light can be deflected to the direction corresponding to the intermediate output port by the first pretilt angle $\Delta\theta_1$. In addition, wedge angles $\alpha$ of the plurality of first prism structures are gradually reduced in the first direction from the edge of the input passive deflection element to its center, so that the first pretilt angles $\Delta\theta_1$ of the plurality of first prism structures can be gradually reduced in the first direction from the edge of the input passive deflection element to its center.

In some embodiments, when N is an even number, the first pretilt angle $\Delta\theta_1$ satisfies $$\Delta\theta_1 = \theta \times (\frac{N}{2} - k), \text{ and } 1 \leq k \leq (\frac{N}{2});$$

or the first pretilt angle $\Delta\theta_1$ satisfies $$\Delta\theta_1 = \theta \times (k - \frac{N}{2} - 1), \text{ and } (\frac{N}{2} + 1) \le k \le N.$$

k is a sequence number of the $k^{th}$ input port of the N input ports, $$\theta \approx \frac{d}{L},$$

d is a distance between two adjacent input ports, and L is an optical path distance between the input passive deflection element and the output passive deflection element. When N is an odd number, the first pretilt angle $\Delta\theta_1$ satisfies $$\Delta\theta_1 = \theta \times |(\frac{N+1}{2} - k)|.$$

In this way, the first pretilt angles $\Delta\theta_1$ of the plurality of first prism structures can be gradually reduced in the first direction from the edge of the input passive deflection element to its center.

In some embodiments, when N is an even number, the wedge angle $\alpha$ satisfies $$\alpha \approx \frac{\theta \times \left|\frac{N}{2} - k\right|}{2(n-1)}, \text{ and } 1 \le k \le (\frac{N}{2});$$

or the wedge angle $\alpha$ satisfies $$\alpha \approx \frac{\theta \times \left|k - \frac{N}{2} - 1\right|}{2(n-1)}, \text{ and } (\frac{N}{2} + 1) \le k \le N,$$

where n is a refractive index of the first prism structure; and when N is an odd number, the wedge angle $\alpha$ satisfies $$\alpha \approx \frac{\theta \times \left|\frac{N+1}{2} - k\right|}{2(n-1)}.$$

In this way, the wedge angles $\alpha$ of the plurality of first prism structures can be gradually reduced in the first direction from the edge of the input passive deflection element to its center.

In some embodiments, the first prism structure includes at least one dimming structure. A range for performing phase modulation on an optical signal by using each dimming structure is 0-2π. Each dimming structure includes a plurality of quadrangular prisms disposed side by side in the first direction. There are quadrangular prisms of Q height levels in each dimming structure in any prism structure. A quadrangular prism of each height level is configured to modulate a phase of an optical signal in the phase modulation range. 2≤Q, and Q is an integer. Height change rates of the plurality of quadrangular prisms in the dimming structure of the first prism structure are gradually reduced in the first direction from the edge of the input passive deflection element to its center. A height direction of the quadrangular prism is parallel to a direction perpendicular to the light incident surface of the input active deflection element. A cross section of the quadrangular prism in the direction perpendicular to the light incident surface of the input active deflection element is a rectangle. In this way, after a light beam is incident to the quadrangular prisms of the first prism structure, phase distribution of light of different wavelengths in the light beam can change, and further the light can be deflected to the direction corresponding to the intermediate output port by the first pretilt angle $\Delta\theta_1$. The height change rates of the plurality of quadrangular prisms in the dimming structure of the first prism structure are gradually reduced in the first direction from the edge of the input passive deflection element to its center, so that the first pretilt angles $\Delta\theta_1$ of the plurality of first prism structures can be gradually reduced in the first direction from the edge of the input passive deflection element to its center. In addition, the first pretilt angle $\Delta\theta_1$ of the first prism structure is more easily adjusted by adjusting heights of the quadrangular prisms. In this way, processing difficulty of the first prism structure can be reduced, and the input passive deflection element can have better mechanical strength and stability.

In some embodiments, quantities of quadrangular prisms in all the first prism structures are the same. Widths of light beams incident to all the first prism structures are approximately the same. Therefore, to simplify a manufacturing process, quadrangular prisms with a same width are manufactured, and the quantities of quadrangular prisms in all the first prism structures may be the same. Certainly, in some other embodiments of this application, the quantities of quadrangular prisms in all the first prism structures may alternatively be different.

In some embodiments, a length of any side of the rectangular cross section of the quadrangular prism in the dimming structure of the first prism structure is less than a minimum wavelength of the incident optical signal, so that a phase of the optical signal can be more effectively adjusted.

In some embodiments, the first prism structure includes S metasurface structures disposed side by side in a second direction, and a range for performing phase modulation on an optical signal by using each metasurface structure is 0-2π. All wavelength channels covered by the first prism structure in the second direction are classified into S bands, and each metasurface structure corresponds to one band, where S≥2, and S is an integer. Each metasurface structure includes a plurality of nano-microcolumns arranged in an array. A distance between two adjacent nano-microcolumns in the first direction is smaller than a center wavelength of a band corresponding to the metasurface structure. Area change rates of cross sections of a plurality of nano-microcolumns in one row in one metasurface structure are gradually reduced in the first direction from the edge of the input passive deflection element to its center, so that the first pretilt angles $\Delta\theta_1$ of the plurality of first prism structures can be gradually reduced in the first direction from the edge of the input passive deflection element to its center. The cross sections are parallel to the light incident surface of the input active deflection element. The plurality of nano-microcolumns in the metasurface structure may form a sub-wavelength structure to deflect an optical signal based on a wavelength of incident light. In addition, heights of any two nano-microcolumns are the same. This facilitates surface attachment or gluing between the input passive deflection element and another optical element.

In some embodiments, in the first direction, quantities of nano-microcolumns in a same row in all the metasurface structures are the same. Widths of light beams incident to all the first prism structures are approximately the same. Therefore, to simplify a manufacturing process, nano-microcolumns with a same cross-sectional area are manufactured, and quantities of nano-microcolumns in all the first prism structures may be the same. Certainly, in some other embodiments of this application, the quantities of nano-microcolumns in all the first prism structures may alternatively be different.

In some embodiments, the input light is a plurality of channels of light obtained through wavelength division multiplexing. The optical selective switch further includes an input grating element and an output grating element. The input grating element is configured to split the input light from each input port into optical signals of different wavelengths based on a plurality of wavelength channels of the input light. The output grating element is configured to multiplex to-be-output light of one or more wavelengths to a same output port. Certainly, in some other embodiments of this application, the input grating element and the output grating element may alternatively be manufactured in a same grating element.

In some embodiments, the first prism structure covers, in the second direction, all wavelength channels of input light from an input port corresponding to the first prism structure. The second direction intersects the first direction. In this way, the first prism structure can deflect, to the direction corresponding to the intermediate output port, optical signals of all wavelengths in the input light from the input port corresponding to the first prism structure.

In some embodiments, the M output ports are disposed side by side in the first direction, and the output passive deflection element includes a plurality of second prism structures disposed side by side in the first direction. At least one of the M output ports except the intermediate output port is in a one-to-one correspondence with the second prism structures. The second prism structure is configured to deflect the to-be-output light to the direction corresponding to the intermediate output port by a second pretilt angle $\Delta\theta_2$. Second pretilt angles $\Delta\theta_2$ of the plurality of second prism structures are gradually reduced in the first direction from an edge of the output passive deflection element to its center. Technical effects of the second prism structure are similar to those of the first prism structure, and details are not described herein again.

In some embodiments, the quantity N of input ports is the same as the quantity M of output ports. A first pretilt angle $\Delta\theta_1$ of a first prism structure corresponding to the $k^{th}$ input port is equal to a second pretilt angle $\Delta\theta_2$ of a second prism structure corresponding to the $k^{th}$ output port, where $1 \leq k \leq N$, and k is an integer. In this case, the plurality of first prism structures in the input passive deflection element and the plurality of second prism structures in the output passive deflection element may be arranged in a mirror mode with respect to a center line of an optical path between the input passive deflection element and the output passive deflection element.

In some embodiments, the input passive deflection element is disposed on a light incident surface of the input active deflection element. The optical selective switch further includes an antireflective film, and the antireflective film is disposed on a side surface of the input passive deflection element close to the input active deflection element. The antireflective film can improve efficiency of emitting an optical signal to the input active deflection element.

In some embodiments, the input passive deflection element is disposed on a light incident surface of the input active deflection element. The input active deflection element is a liquid crystal on silicon panel. The liquid crystal on silicon includes a silicon substrate and a transparent cover plate that are disposed opposite to each other, and a liquid crystal layer located between the silicon substrate and the transparent cover plate. The first prism structure is disposed on a side surface of the transparent cover plate far away from the silicon substrate.

In some embodiments, when N is an odd number, at least the $((N+1)/2)^{th}$ input port of the N input ports is an intermediate input port; or when N is an even number, at least the $(N/2)^{th}$ input port and the $(N/2+1)^{th}$ input port of the N input ports are all intermediate input ports. When M is an odd number, at least the $((M+1)/2)^{th}$ output port of the M output ports is an intermediate output port; or when M is an even number, at least the $(M/2)^{th}$ output port and the $(M/2+1)^{th}$ output port of the M output ports are all intermediate output ports.

In some embodiments, when $$\left|\frac{N+1}{2} - k\right| \leq \frac{N}{4},$$

the $k^{th}$ input port is an intermediate input port. In this way, no first prism structure may be disposed at a position that is on the input passive deflection element and that is corresponding to the $k^{th}$ input port satisfying the foregoing formula, so that a first pretilt angle $\Delta\theta_1$ of the input passive deflection element relative to the $k^{th}$ input port satisfying the foregoing formula is 0. When $$\left|\frac{M+1}{2} - k\right| \leq \frac{M}{4},$$

the $k^{th}$ output port is an intermediate output port. Similarly, no second prism structure may be disposed at a position that is on the output passive deflection element and that is corresponding to the $k^{th}$ output port satisfying the foregoing formula, so that a second pretilt angle $\Delta\theta_2$ of the output passive deflection element relative to the $k^{th}$ output port satisfying the foregoing formula is 0.

According to another aspect of embodiments of this application, an optical selective switch is provided, including N input ports, M output ports, an input active deflection element, and an output active deflection element. N is an integer greater than or equal to 3, and M is an integer greater than or equal to 3. Each input port is configured to receive input light. One end that is of at least one of the N input ports except an intermediate input port and that is on an inner side of the optical selective switch is deflected to a direction corresponding to the intermediate input port. Each output port is configured to output to-be-output light from the output port. One end that is of at least one of the M output ports except an intermediate output port and that is on the inner side of the optical selective switch is deflected to a direction corresponding to the intermediate output port. The active deflection element is configured to deflect the input light to a direction corresponding to a target output port. The output active deflection element is configured to deflect the to-be-output light to the target output port. In this case, by deflecting some input ports and some output ports of the optical selective switch to positions of the intermediate ports, angles at which the input active deflection element and the output active deflection element deflect incident optical signals can be reduced to increase energy of optical signals received by the output ports, thereby improving diffraction efficiency of the optical selective switch during light beam deflection. In addition, because the angles at which the input active deflection element and the output active deflection element deflect the incident optical signals are reduced, an isolation between optical signals transmitted between different output ports can be increased.

In some embodiments, one end that is of at least one of the N input ports except the intermediate input port and that is on the inner side of the optical selective switch is deflected to the direction corresponding to the intermediate input port by a first pretilt angle $\Delta\theta_1$. The first pretilt angle $\Delta\theta_1$ is gradually reduced in a direction from an input port at an edge to the intermediate input port. In this way, a difference between a maximum angle at which the input active deflection element deflects an input port at an edge position and a maximum angle at which the input active deflection element deflects an input port at a middle position can be reduced.

In some embodiments, the quantity N of input ports is the same as the quantity M of output ports. A first pretilt angle $\Delta\theta_1$ of the $k^{th}$ input port is equal to a second pretilt angle $\Delta\theta_2$ of the $k^{th}$ output port, where $1 \le k \le N$, and k is an integer. In this case, a plurality of first prism structures in the input passive deflection element and a plurality of second prism structures in the output passive deflection element may be arranged in a mirror mode with respect to a center line of an optical path between the input passive deflection element and the output passive deflection element.

According to still another aspect of embodiments of this application, a node apparatus is provided, including any optical selective switch described above. The node apparatus has same technical effects as the node apparatus provided in the foregoing embodiment, and details are not described herein again.

BRIEF DESCRIPTION OF DRAWINGS

FIG. 1b is a schematic diagram of a structure of a node apparatus in FIG. 1a;

FIG. 3a is a schematic diagram of an optical path of the optical selective switch shown in FIG. 2a;

FIG. 3b is a schematic diagram of another optical path of the optical selective switch shown in FIG. 2a;

FIG. 3c is a schematic diagram of another optical path of the optical selective switch shown in FIG. 2a;

FIG. 5 is a schematic diagram of a structure of an input active deflection element in FIG. 3a;

FIG. 6 is a schematic diagram of a structure of an input active deflection element and an input passive deflection element in FIG. 3a;

FIG. 8a is a schematic diagram of another optical path of the optical selective switch shown in FIG. 2a;

FIG. 8b is a schematic diagram of another structure of the input active deflection element and the input passive deflection element in FIG. 3a;

FIG. 8c is a schematic diagram of another structure of the input active deflection element and the input passive deflection element in FIG. 3a;

FIG. 10b is a sectional view obtained by sectioning along a dashed line D-D in FIG. 10a;

FIG. 10c is a schematic diagram of an optical path of a WSS provided with the first switch structure shown in FIG. 10a;

FIG. 12b is a sectional view obtained by sectioning along a dashed line D-D in FIG. 12a;

FIG. 12c is another sectional view obtained by sectioning along the dashed line D-D in FIG. 12a;

FIG. 13b is a schematic diagram of a structure obtained along a direction A in FIG. 13a;

FIG. 13c is a schematic diagram of another structure obtained along the direction A in FIG. 13a;

FIG. 14b is a schematic diagram of an optical path of the optical selective switch in FIG. 14a.

DESCRIPTION OF EMBODIMENTS

The following describes the technical solutions in embodiments of this application with reference to the accompanying drawings in embodiments of this application.

It is clear that the described embodiments are merely a part rather than all of embodiments of this application.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the descriptions of this application, unless otherwise stated, "a plurality of" means two or more than two.

In addition, in embodiments of this application, orientation terms such as "upper", "lower", "left", and "right" may include but are not limited to definitions based on illustrated orientations in which components in the accompanying drawings are placed. It should be understood that, these directional terms may be relative concepts. They are used for description and clarification of relative positions, and may vary accordingly depending on a change in the orientations in which the components in the accompanying drawings are placed in the accompanying drawings.

In embodiments of this application, unless otherwise clearly specified and limited, a term "connection" should be understood in a broad sense. For example, the "connection" may be a fixed connection, a detachable connection, or an integrated connection, or may be a direct connection or an indirect connection implemented through an intermediate medium.

Figure 1A:
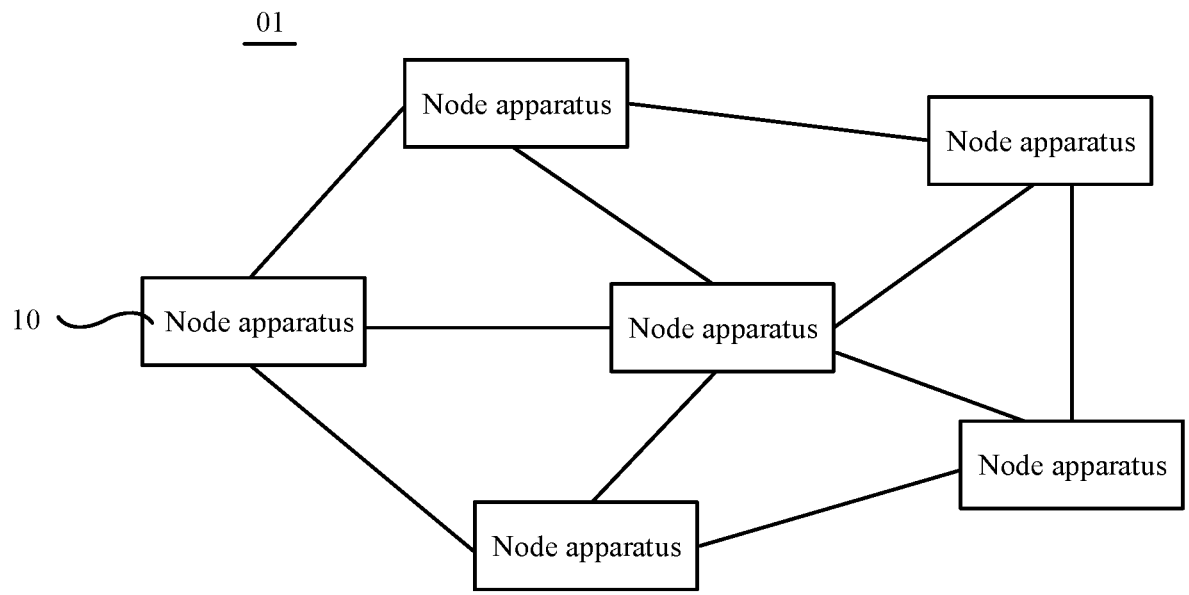
FIG. 1a is a schematic diagram of a structure of an optical network according to an embodiment of this application.

This application provides a node apparatus 10 that may be applied to an optical network 01 shown in FIG. 1a. The optical network 01 may be applied to various communication scenarios, for example, a local telephone trunk line, long-distance trunk communication, a global communication network, or public telecommunication networks in various countries. The optical network 01 may be further applied to television signal transmission, monitoring and scheduling in an industrial production site, traffic surveillance control and commanding, cable television networks in cities and towns, a community antenna television (CATV), a fiber optic local area network, and the like.

Figure 1B:
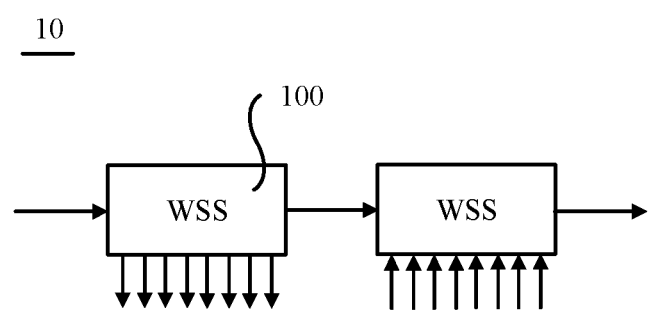

The optical network 01 may include a plurality of node apparatuses 10, and the node apparatuses 10 are connected to each other through an optical channel. One node apparatus 10 may be connected to any quantity of other node apparatuses 10. The node apparatus 10 may be a reconfigurable optical add-drop multiplexer (OADM) or an optical cross-connect (OXC). In some embodiments of this application, as shown in FIG. 1b, the node apparatus 10 may include a plurality of optical selective switches 100, for example, WSSs, to implement a function of wavelength scheduling between different dimensions. The optical selective switch 100 has a function of outputting an input light of a wavelength from any output port, so that the node apparatus 10 can configure any wavelength at any port.

Figure 2A:
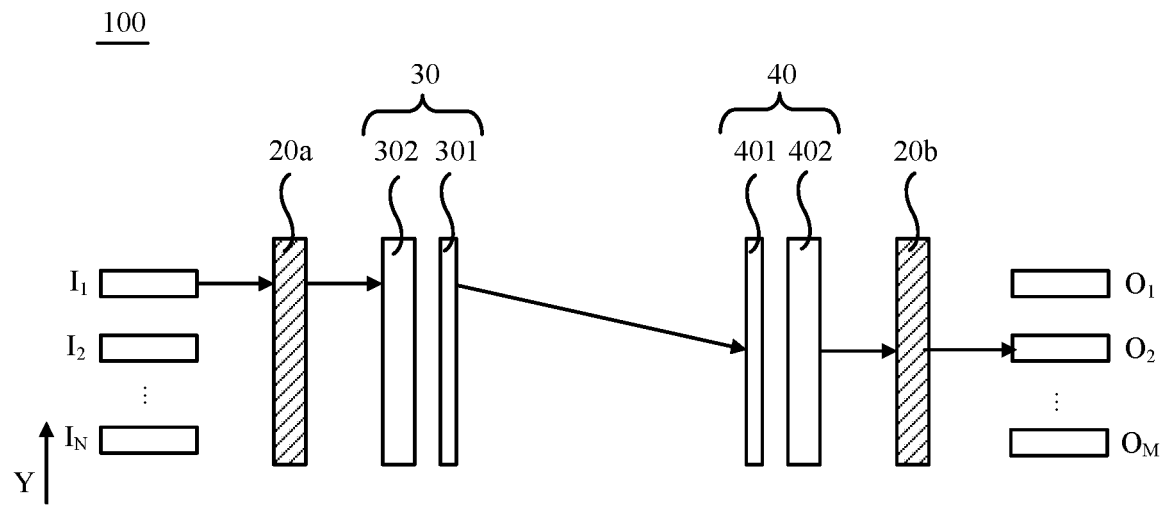
FIG. 2a is a schematic diagram of a structure of an optical selective switch in FIG. 1b.

A structure of the optical selective switch 100 provided in this embodiment of this application is shown in FIG. 2a, and includes N input ports ($I_1, I_2, I_3, \ldots,$ and IN), M output ports ($O_1, O_2, O_3, \ldots,$ and $O_M$), a first switch structure 30, and a second switch structure 40.

Figure 2B:
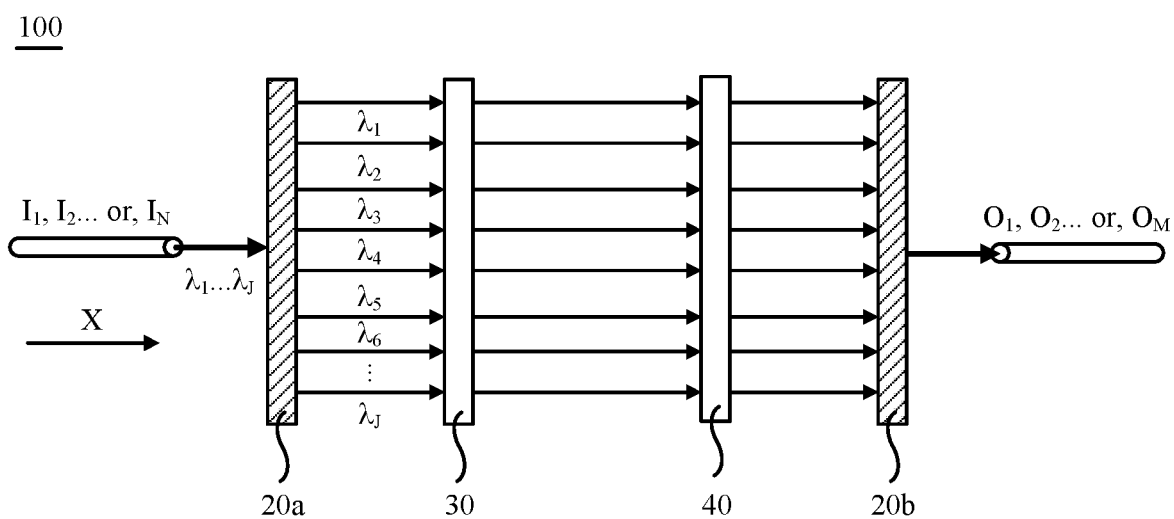
FIG. 2b is a schematic diagram of another structure of the optical selective switch in FIG. 1b.

The N input ports ($I_1, I_2, I_3, \ldots,$ and $I_N$) are disposed side by side in a first direction Y (which may also be referred to as a port direction). Each input port is configured to receive one or more light beams as input light. The input light has a plurality of wavelength channels ($\lambda_1, \lambda_2, \lambda_3, \ldots,$ and $\lambda_J$) in a second direction X (which may also be referred to as a wavelength direction) shown in FIG. 2b, and each wavelength channel may be configured to pass an optical signal of one wavelength or one band. $N \geq 3$, and N is an integer. $J \geq 2$, and J is a positive integer. The first direction Y may intersect the second direction X. In some embodiments of this application, the first direction Y may be orthogonal to the second direction X.

In this way, optical signals of different wavelengths may be mixed together as the input light and transmitted through one input port ($I_1, I_2, I_3, \ldots,$ or $I_N$), to implement a wavelength division multiplexing (wavelength division multiplexing, WDM) technology. This implements high-speed data propagation. Digital signals carried by optical signals of different wavelengths in input light from a same input port may have a same rate and use a same data format, or may have different rates and use different data formats.

In addition, there may be at least one intermediate input port in the N input ports ($I_1, I_2, I_3, \ldots,$ and $I_N$) disposed side by side in the first direction Y shown in FIG. 2a. In some embodiments of this application, when N is an odd number, at least the $((N+1)/2)^{th}$ input port of the N input ports ($I_1, I_2, I_3, \ldots,$ and $I_N$) may be the intermediate input port. For example, when N=3, the second input port $I_2$ is the intermediate input port. Alternatively, for another example, when N=5, the third input port $I_3$ is the intermediate input port.

In some other embodiments of this application, when N is an even number, at least the $(N/2)^{th}$ input port and the $(N/2+1)^{th}$ input port of the N input ports ($I_1, I_2, I_3, \ldots,$ and $I_N$) are the intermediate input ports. For example, when N=4, the second input port $I_2$ and the third input port $I_3$ are the intermediate input ports. Alternatively, for another example, when N=6, the third input port $I_3$ and the fourth input port $I_4$ are the intermediate input ports.

In addition, as shown in FIG. 2a, the M output ports ($O_1, O_2, O_3, \ldots,$ and $O_M$) may be disposed side by side in the first direction Y. Each output port is configured to output to-be-output light from the output port. Similarly, it can be learned that, to implement the WDM technology, to-be-output light of different wavelengths may be mixed together and transmitted through one output port ($O_1, O_2, O_3, \ldots,$ or $O_M$). $M \geq 3$, and in some embodiments of this application, values of N and M may be equal or different.

Based on this, there may be at least one intermediate output port in the M output ports ($O_1, O_2, O_3, \ldots,$ and $O_M$) disposed side by side in the first direction Y. In some embodiments of this application, when the quantity M of output ports is an odd number, at least the $((M+1)/2)^{th}$ output port of the M output ports ($O_1, O_2, O_3, \ldots,$ and $O_M$) may be the intermediate output port. For example, when M=3, the second output port $O_2$ is the intermediate output port. Alternatively, for another example, when M=5, the third output port $O_3$ is the intermediate output port.

In some other embodiments of this application, when M is an even number, at least the $(M/2)^{th}$ output port and the $(M/2+1)^{th}$ output port of the M output ports ($O_1, O_2, O_3, \ldots,$ and $O_M$) are the intermediate output ports. For example, when M=4, the second output port $O_2$ and the third output port $O_3$ are the intermediate output ports. Alternatively, for another example, when M=6, the third output port $O_3$ and the fourth output port $O_4$ are the intermediate output ports.

In some embodiments of this application, the N input ports ($I_1, I_2, I_3, \ldots,$ and $I_N$) and the M output ports ($O_1, O_2, O_3, \ldots,$ and $O_M$) may be located on a same side and disposed side by side in the first direction Y. In some accompanying drawings in embodiments of this application, to facilitate description of a beam propagation path, a description is provided by using an example in which the N input ports ($I_1, I_2, I_3, \ldots,$ and $I_N$) and the M output ports ($O_1$, $O_2$, $O_3$, ..., and $O_M$) may be respectively disposed on both sides of the first switch structure 30 and the second switch structure 40.

In addition, when the input light is a plurality of channels of light obtained through wavelength division multiplexing, the optical selective switch 100 may further include an input grating element 20a and an output grating element 20b shown in FIG. 2a. The input grating element 20a may be located between the N input ports ($I_1$, $I_2$, $I_3$, ..., and $I_N$) and the first switch structure 30. The input grating element 20a may be configured to: split the input light from each input port ($I_1$, $I_2$, $I_3$, ..., and $I_N$) into optical signals of different wavelengths based on the plurality of wavelength channels of the input light, and transmit the optical signals to the first switch structure 30.

Further, the output grating element 20b may be located between the second switch structure 40 and the M output ports ($O_1$, $O_2$, $O_3$, ..., and $O_M$). The output grating element 20b may be configured to multiplex to-be-output light of one or more wavelengths to a same output port ($O_1$, $O_2$, $O_3$, ..., or $O_M$).

In some embodiments of this application, the optical selective switch 100 may further include a light collimation element (not shown in the figure) disposed between the N input ports ($I_1$, $I_2$, $I_3$, ..., and $I_N$) and the input grating element 20a. The light collimation element can enable the input light from the N input ports ($I_1$, $I_2$, $I_3$, ..., and $I_N$) to be vertically incident to a light incident surface of an input grating element 20a in a normal direction of the light incident surface of the input grating element 20a, so that the input grating element 20a can more accurately split the incident light. Similarly, the optical selective switch 100 may further include a light collimation element disposed between the output grating element 20b and the M output ports ($O_1$, $O_2$, $O_3$, ..., and $O_M$). Technical effects of the light collimation element are the same as those described above, and details are not described herein again.

Figure 3A:
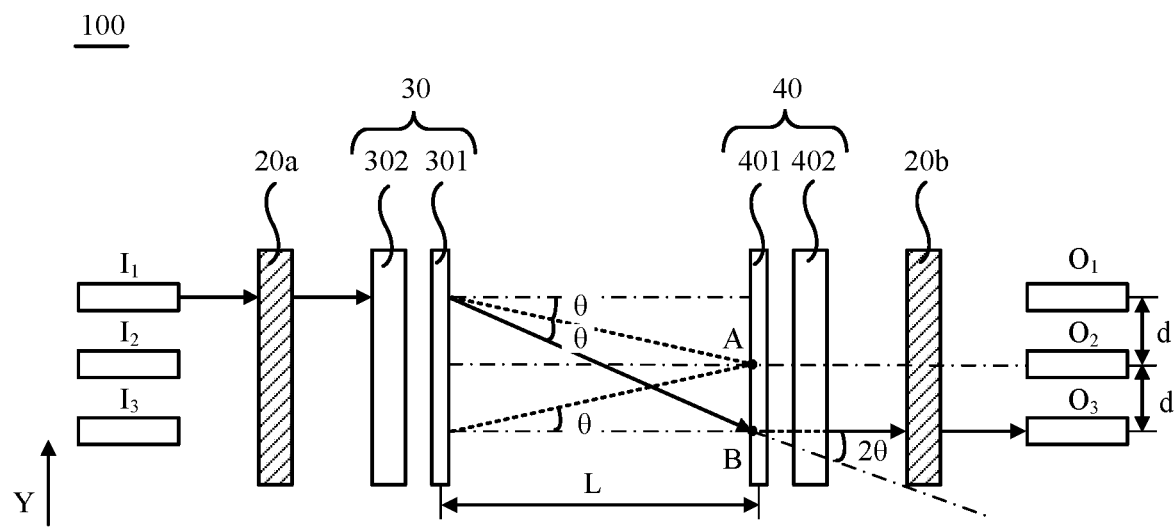

As shown in FIG. 3a, the first switch structure 30 is disposed on one side of the input grating element 20a far away from the N input ports ($I_1$, $I_2$, $I_3$, ..., and $I_N$). The first switch structure 30 is configured to perform phase adjustment on input light of different wavelengths that is obtained through splitting by the input grating element 20a, to deflect, based on a requirement, the input light to a direction corresponding to a target output port. In some embodiments of this application, the first switch structure 30 may include an input active deflection element 301 and an input passive deflection element 302 that are shown in FIG. 3a.

The input passive deflection element 302 is configured to deflect the input light to a direction corresponding to an intermediate output port. For example, the optical selective switch 100 includes three (N=3) input ports: $I_1$, $I_2$, and $I_3$ and three (M=3) output ports: $O_1$, $O_2$, and $O_3$ that are shown in FIG. 3a. An intermediate input port is the input port $I_2$, and the intermediate output port is the output port $O_2$. In this case, the input passive deflection element 302 is configured to deflect the input light to a direction corresponding to the intermediate output port $O_2$.

It should be noted that, there is another element for light deflection, for example, the second switch structure 40, between the input passive deflection element 302 and the M output ports. Therefore, to describe only a light deflection function of the input passive deflection element 302, in this embodiment of this application, that the input passive deflection element 302 deflects the input light to the direction corresponding to the intermediate output port may be: The input passive deflection element 302 deflects the input light to a direction toward a position (for example, a point A in FIG. 3a) of vertical projection of the intermediate output port (for example, the output port $O_2$) on the second switch structure 40.

In addition, the input active deflection element 301 in the first switch structure 30 is configured to deflect, based on the deflection of the input passive deflection element 302, the input light to the direction corresponding to the target output port. In this way, the input active deflection element 301 can perform secondary deflection on the input light based on a position of the target output port and a deflection angle of the input passive deflection element 302, so that the input light after secondary deflection can be deflected to the direction corresponding to the target output port.

It should be noted that, in this embodiment of this application, the target output port is defined as follow: Based on a requirement of optical signal transmission in the optical selective switch 100, input light that is from an input port and that has passed through the input grating element 20a and the first switch structure 30 is used as to-be-output light and then the to-be-output light is output from an output port after passing through the second switch structure 40 and the output grating element 20b. In this case, the output port is the target output port.

For example, in FIG. 3a, based on a requirement of optical signal transmission in the optical selective switch 100, input light that is from an input port $I_1$ and that has passed through the input grating element 20a and the first switch structure 30 is used as to-be-output light, and then the to-be-output light is output from an output port $O_3$ after passing through the second switch structure 40 and the output grating element 20b. In this case, the target output port is the output port $O_3$. In addition, the direction corresponding to the target output port may be a direction toward a position (for example, a point B in FIG. 3a) of vertical projection of the target output port (for example, the output port $O_3$) on the second switch structure 40.

A process of deflecting input light by the input active deflection element 301 and the input passive deflection element 302 in the first switch structure 30 is described below with reference to FIG. 3a.

As shown in FIG. 3a, the input passive deflection element 302 may deflect, to a direction corresponding to the intermediate output port $O_2$ (that is, to the point A), all optical signals obtained by splitting input light from the input port $I_1$ and the input port $I_3$ by the input grating element 20a. For example, the input passive deflection element 302 may deflect, to the direction corresponding to the intermediate output port $O_2$ by an angle $\theta$, all the optical signals obtained by splitting the input light from the input port $I_1$ and the input port $I_3$ by the input grating element 20a.

It should be noted that, when an optical signal transmission distance, that is, an optical path distance L, between the first switch structure 30 and the second switch structure 40 is far greater than a distance d between two adjacent output ports, the angle $\theta$ is less than 10°, for example, approximately 5°. In this case, the angle $\theta$ in FIG. 3a may satisfy a formula: $\theta \approx d/L$.

It can be learned from the foregoing description that, before the optical signals obtained by splitting the input light from the input port $I_1$ and the input port $I_3$ by the input grating element 20a enters the first switch structure 30, the optical signals are emitted perpendicular to a light emergent surface of the input grating element 20a in a normal direction of a light incident surface or the light emergent surface of the input grating element 20a. In addition, after the input passive deflection element 302 deflects, to the direction corresponding to the intermediate output port $O_2$ by the angle θ, all the optical signals obtained by splitting the input light from the input port $I_1$ and the input port $I_3$ by the input grating element 20a, as shown in FIG. 3a, optical signals obtained by splitting the input light from the input port $I_1$ by the input grating element 20a are deflected downward by the angle θ based on the deflection of the input passive deflection element 302; and optical signals obtained by splitting the input light from the input port $I_3$ by the input grating element 20a are deflected upward by the angle θ based on the deflection of the input passive deflection element 302.

In this way, when the input light from the input port $I_1$ is transmitted to the output port $O_3$ after passing through the input grating element 20a, the first switch structure 30, the second switch structure 40, and the output grating element 20b, it can be learned from the foregoing description that, the input passive deflection element 302 may deflect the input light from the input port $I_1$ downward to the direction corresponding to the intermediate output port $O_2$ by the angle θ. In this case, when the input active deflection element 301 deflects the input light from the input port $I_1$ to the output port $O_3$, the input active deflection element 301 only needs to deflect the input light from the input port $I_1$ downward by the angle θ.

In addition, the second switch structure 40 is disposed between the first switch structure 30 and the output grating element 20b. The second switch structure 40 is configured to perform phase adjustment on to-be-output light to deflect the to-be-output light to a target output port based on a requirement. In some embodiments of this application, the second switch structure 40 may include an output active deflection element 401 and an output passive deflection element 402 shown in FIG. 3a.

The output passive deflection element 402 is configured to deflect the to-be-output light to the direction corresponding to the intermediate output port. It should be noted that, because there is no other element for light deflection between the output passive deflection element 402 and the M output ports, a light deflection function of the output passive deflection element 402 may be directly described based on a position of an output port.

In this case, in this embodiment of this application, that the output passive deflection element 402 deflects the to-be-output light to the direction corresponding to the intermediate output port may be: The output passive deflection element 402 deflects the to-be-output light to a direction toward a position of the intermediate output port (for example, the output port $O_2$ in FIG. 3a).

In addition, the output active deflection element 401 in the second switch structure 40 is configured to deflect the to-be-output light to the target output port based on the deflection of the output passive deflection element 402. In this way, the output active deflection element 401 can perform secondary deflection on the to-be-output light based on the target output port and a deflection angle of the output passive deflection element 402, so that the to-be-output light after secondary deflection can be deflected to the target output port.

A process of deflecting to-be-input light by the output active deflection element 401 and the output passive deflection element 402 in the second switch structure 40 is described below with reference to FIG. 3a.

For example, the optical selective switch 100 includes three (N=3) input ports: $I_1$, $I_2$, and $I_3$ and three (M=3) output ports: $O_1$, $O_2$, and $O_3$ that are shown in FIG. 3a, the intermediate input port is the input port $I_2$, and the intermediate output port is the output port $O_2$. The output passive deflection element 402 may deflect, to a direction corresponding to the intermediate output port $O_2$, to-be-output light that is from the first switch structure 30 and that needs to be multiplexed to target output ports, for example, the output port $O_1$ and the output port $O_3$, through the output grating element 20b.

It can be learned from the foregoing description that, as shown in FIG. 3a, in a process in which input light that is from the input port $I_1$ and that has passed through the input grating element 20a and the first switch structure 30 is used as to-be-output light and then the to-be-output light is transmitted to the output port $O_3$ after passing through the second switch structure 40 and the output grating element 20b, under a joint action of the input active deflection element 301 and the input passive deflection element 302 in the first switch structure 30, the input light from the input port $I_1$ may be deflected downward by an angle 2θ to the direction corresponding to the intermediate output port $O_2$.

In this case, if no processing is performed on an optical signal output from the first switch structure 30, as shown in FIG. 3a, the optical signal output from the first switch structure 30 continues to be transmitted downward along a dotted line, and therefore cannot reach the output port $O_3$. Therefore, to ensure that the optical signal output from the first switch structure 30 is used as to-be-output light and then the to-be-output light can be transmitted to the output port $O_3$ after passing through the second switch structure 40 and the output grating element 20b, the output passive deflection element 402 in the second switch structure 40 may deflect, to the direction corresponding to the intermediate output port $O_2$, to-be-output light that is from the first switch structure 30 and that needs to be multiplexed to the output port $O_3$ through the output grating element 20b, that is, deflect the to-be-output light upward by an angle θ.

In this case, the output active deflection element 401 in the second switch structure 40 only needs to deflect, to the target output port $O_3$ based on the deflection of the output passive deflection element 402, the to-be-output light that is from the first switch structure 30 and that needs to be multiplexed to the output port $O_3$ through the output grating element 20b, that is, deflect the to-be-output light upward by the angle θ, without a need to deflect the to-be-output light upward by an angle 2θ.

The foregoing description is provided by using an example in which the input light that is from the input port $I_1$ and that has passed through the input grating element 20a and the first switch structure 30 is used as the to-be-output light and then the to-be-output light is transmitted to the output port $O_3$ after passing through the second switch structure 40 and the output grating element 20b. In addition, when the input light that is from the input port $I_1$ and that has passed through the input grating element 20a and the first switch structure 30 is used as the to-be-output light and then the to-be-output light is transmitted to the output port $O_1$ after passing through the second switch structure 40 and the output grating element 20b, the input passive deflection element 302 may deflect the input light from the input port $I_1$ downward to the direction corresponding to the intermediate output port $O_2$ by the angle θ.

In this case, when the input active deflection element 301 deflects the input light from the input port $I_1$ to the target output port, that is, the output port $O_1$, based on the deflection of the input passive deflection element 302, the input active deflection element 301 only needs to deflect the input light from the input port $I_1$ upward by the angle θ.

Figure 3B:
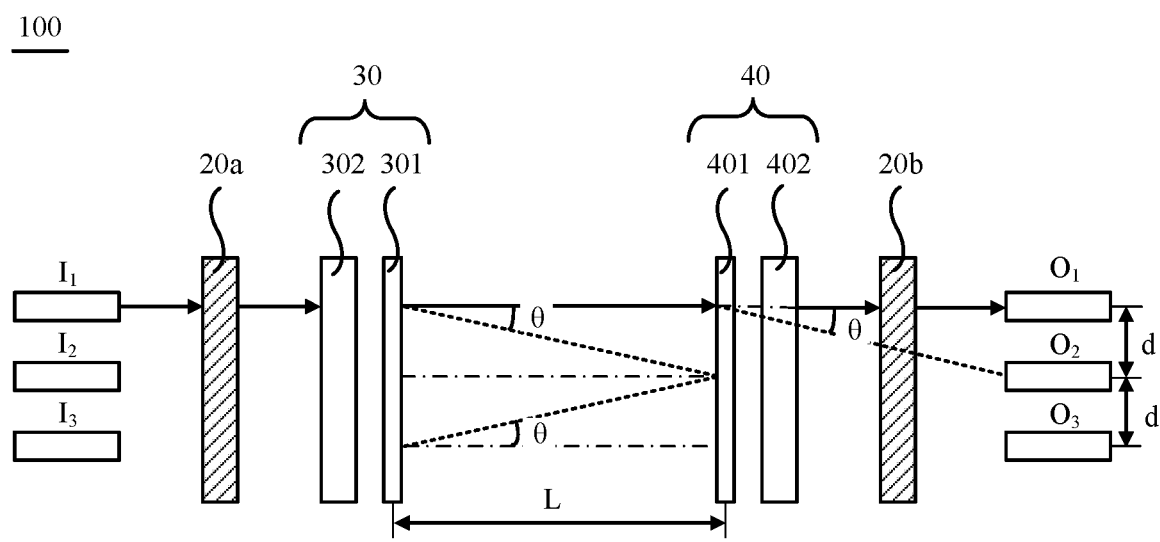

Next, it can be learned from the foregoing description that, the output passive deflection element 402 may deflect, along a dashed line shown in FIG. 3b and to the direction corresponding to the intermediate output port $O_2$, to-be-output light that is from the first switch structure 30 and that needs to be multiplexed to the output port $O_1$ through the output grating element 20b, that is, deflect the to-be-output light downward by the angle θ. Based on this, the output active deflection element 401 may deflect the to-be-output light of various wavelengths upward by the angle θ based on the deflection of the output passive deflection element 402, to deflect the to-be-output light to the target output end, that is, the output port $O_1$.

In this way, under a joint action of the output active deflection element 401 and the output passive deflection element 402 in the second switch structure 40, the to-be-output light that is from the first switch structure 30 and that needs to be multiplexed to the output port $O_1$ through the output grating element 20b can be deflected to the output port $O_1$.

It should be noted that, the input port $I_3$ and the input port $I_2$ are symmetrically disposed with respect to the input port $I_1$. Therefore, a process in which input light from the input port $I_3$ needs to be deflected to the output port $O_1$ and a process in which the input light from the input port $I_3$ needs to be deflected to the output port $O_3$ may be similar to a deflection process of the input light from the input port $I_1$. Details are not described herein again. In addition, the input passive deflection element 302 no longer deflects input light that is from the intermediate input port $I_2$ and that is obtained through splitting by the input grating element 20a. The output passive deflection element 402 no longer deflects to-be-output light that is from the first switch structure 30 and that needs to be multiplexed to the intermediate output port $O_2$ through the output grating element 20b.

Figure 3C:
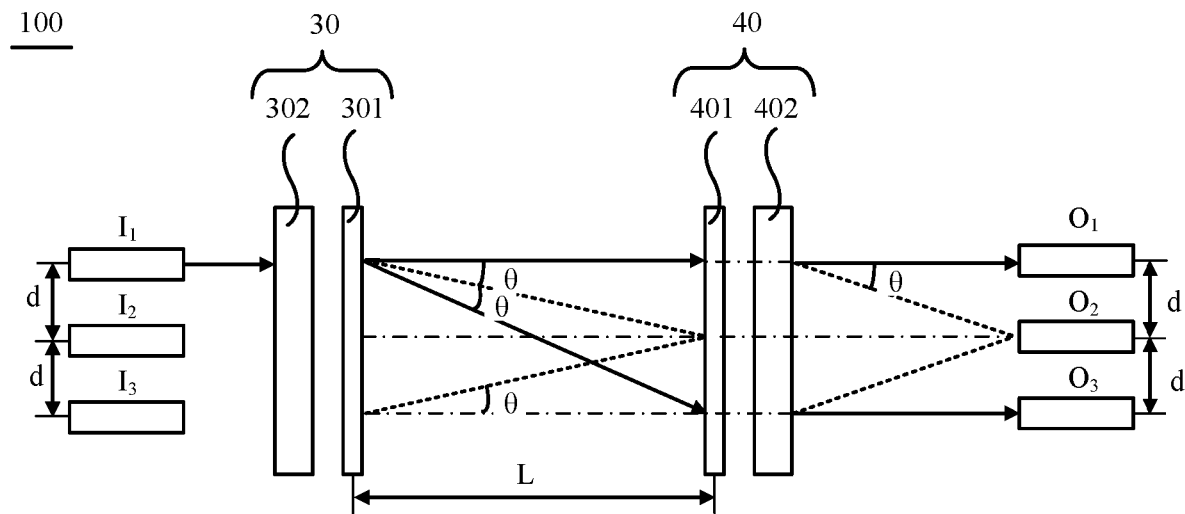

In conclusion, on one hand, as shown in FIG. 3c, the input light from the input port $I_1$ may be deflected to the direction corresponding to the intermediate output port $O_2$ by the angle θ based on the deflection of the input passive deflection element 302. In this case, when the input light from the input port $I_1$ needs to be deflected to a direction corresponding to the output port $O_1$ as the target output port, the input active deflection element 301 may deflect the input light from the input port $I_1$ upward by the angle θ. In addition, when the input light from the input port $I_1$ needs to be deflected to the output port $O_3$, the input active deflection element 301 may deflect the input light from the input port $I_1$ downward by the angle θ. In this way, even if the input port $I_1$ and the output port $O_3$ are not in a same horizontal direction, angles at which the input active deflection element 301 deflects the optical signals may both be θ.

Figure 4:
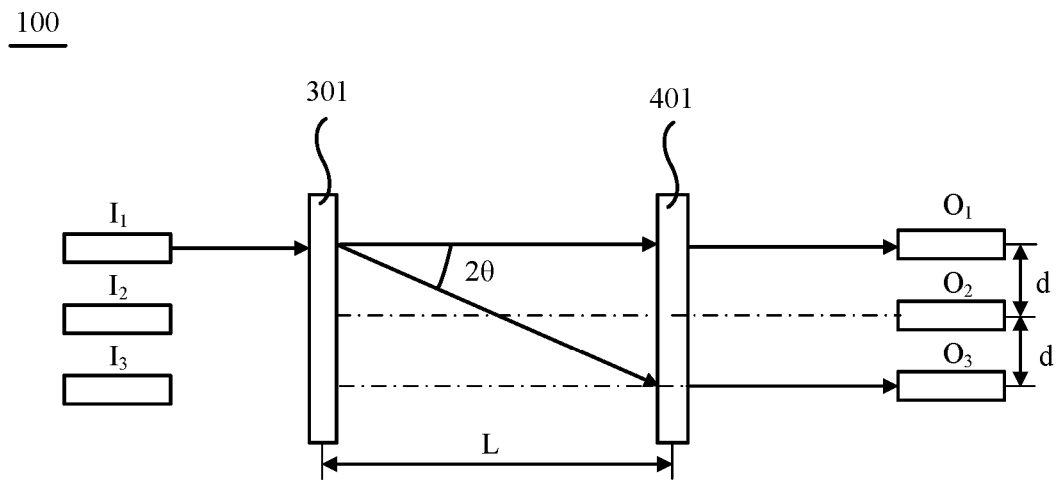
FIG. 4 is a schematic diagram of a structure of another optical selective switch according to an embodiment of this application.

In this case, if the input passive deflection element 302 and the output passive deflection element 402 are not provided, as shown in FIG. 4, to enable the input light from the input port $I_1$ to be deflected to a direction corresponding to the output port $O_3$ as the target output port, the input active deflection element 301 needs to deflect the input light from the input port $I_1$ downward by an angle 2θ. Therefore, compared with the solution shown in FIG. 4, in this application, by adding the input passive deflection element 302 and the output passive deflection element 402 to the optical selective switch 100, some optical signals incident to the input passive deflection element 302 and the output passive deflection element 402 can be deflected to the direction corresponding to the intermediate output port $O_2$.

In this way, angles at which the input active deflection element 301 and the output active deflection element 401 deflect incident optical signals can be reduced to increase energy of optical signals received by the output ports, thereby improving diffraction efficiency of the optical selective switch 100, for example, a WSS, during light beam deflection. In addition, because the angles at which the input active deflection element 301 and the output active deflection element 401 deflect the incident optical signals are reduced, an isolation between optical signals transmitted between different output ports can be increased.

On the other hand, when both the quantity N of input ports and the quantity M of output ports in the optical selective switch 100 are 3, a maximum angle at which the input active deflection element 301 deflects input light and a maximum angle at which the output active deflection element 401 deflects to-be-output light are both the angle θ. Therefore, errors of optical signals received by different output ports are the same, and signal losses generated are also the same, thereby implementing balance between a port insertion loss and port crosstalk. In this way, an amplifier may be connected to an output end of the optical selective switch 100, and errors of optical signals output from different ports are compensated by using a same amplification factor.

In addition, the input active deflection element 301 and the output active deflection element 401 each may be a reflection-type phase diffraction grating, for example, a liquid crystal on silicon (LCoS) panel, a micro electro mechanical system (MEMS), or a digital micro-mirror device (DMD). Alternatively, the input active deflection element 301 and the output active deflection element 401 each may be a transmission-type phase diffraction grating, for example, a liquid crystal panel.

For the transmission-type phase diffraction grating, an optical signal can be deflected only after passing through the transmission-type phase diffraction grating, and a relatively high optical loss is caused in a propagation process of the optical signal. However, the reflection-type phase diffraction grating is used to reflect an incident optical signal and perform phase adjustment. Therefore, optical signal utilization is relatively high.

Types of the input active deflection element 301 and the output active deflection element 401 are not limited in this application. When the input active deflection element 301 and the output active deflection element 401 are transmission-type phase diffraction gratings, relative positions of the input active deflection element 301 and the input passive deflection element 302 and relative positions of the output active deflection element 401 and the output passive deflection element 402 are not limited in this application.

For example, in FIG. 3a, FIG. 3b, and FIG. 3c, the input active deflection element 301 is further away from the input ports compared with the input passive deflection element 302. The output active deflection element 401 is further away from the output ports compared with the output passive deflection element 402. Certainly, in some other embodiments of this application, the input active deflection element 301 may be closer to the input ports than the input passive deflection element 302. The output active deflection element 401 may be closer to the output ports than the output passive deflection element 402.

Figure 5:
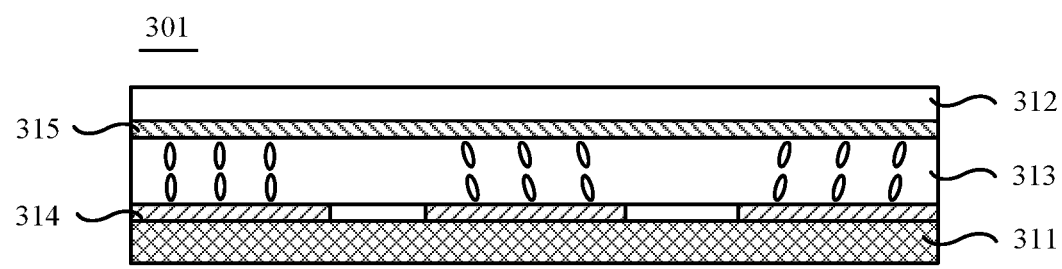

For ease of description, the following description is provided by using an example in which the input active deflection element 301 and the output active deflection element 401 are reflection-type phase diffraction gratings, for example, LCoS panels. As shown in FIG. 5, the LCoS panel may include a silicon substrate 311, a transparent cover plate 312, and a liquid crystal layer 313 located between the silicon substrate 311 and the transparent cover plate 312 that are disposed opposite to each other. The silicon substrate 311 is provided with a pixel circuit arranged in an array. Each pixel circuit is provided with a first electrode 314. A second electrode 315 is disposed on one side of the transparent cover plate 312 close to the silicon substrate 311.

In this case, by applying a voltage to the second electrode 315 and adjusting voltages applied to first electrodes 314 in different pixel circuits, deflection angles of some liquid crystal molecules that are at the liquid crystal layer and that are corresponding to positions of the pixel circuits can be controlled, so that an optical signal passing through the liquid crystal layer can be deflected. The silicon substrate 311 in the LCoS panel may reflect an incident optical signal.

Figure 6:
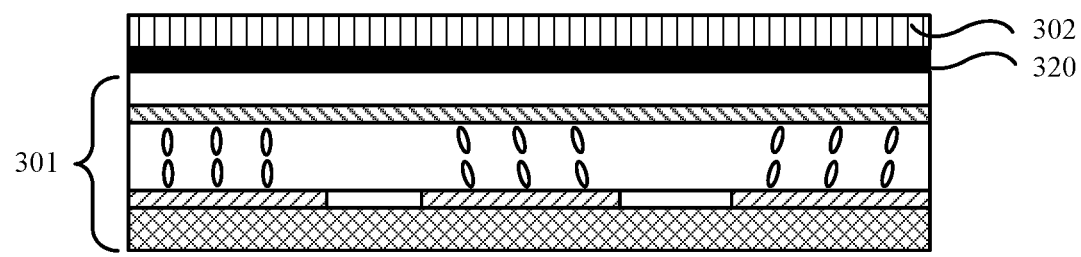

Based on this, in some embodiments of this application, as shown in FIG. 6, the input passive deflection element 302 may be disposed on a light incident surface of the input active deflection element 301. For example, the input passive deflection element 302 may be disposed on one side of the transparent cover plate 312 in the input active deflection element 301 away from the silicon substrate 311. In this case, to improve efficiency of emitting an optical signal to the input active deflection element 301, the optical selective switch 100 further includes an antireflective film 320. The antireflective film 320 is disposed on one side of the input passive deflection element 302 close to the input active deflection element 301. For example, the antireflective film 320 may be attached to a side surface of the input passive deflection element 302 close to the input active deflection element 301, or the antireflective film 320 may be attached to a side surface of the transparent cover plate 312 in the input active deflection element 301 away from the silicon substrate 311.

Figure 7A:
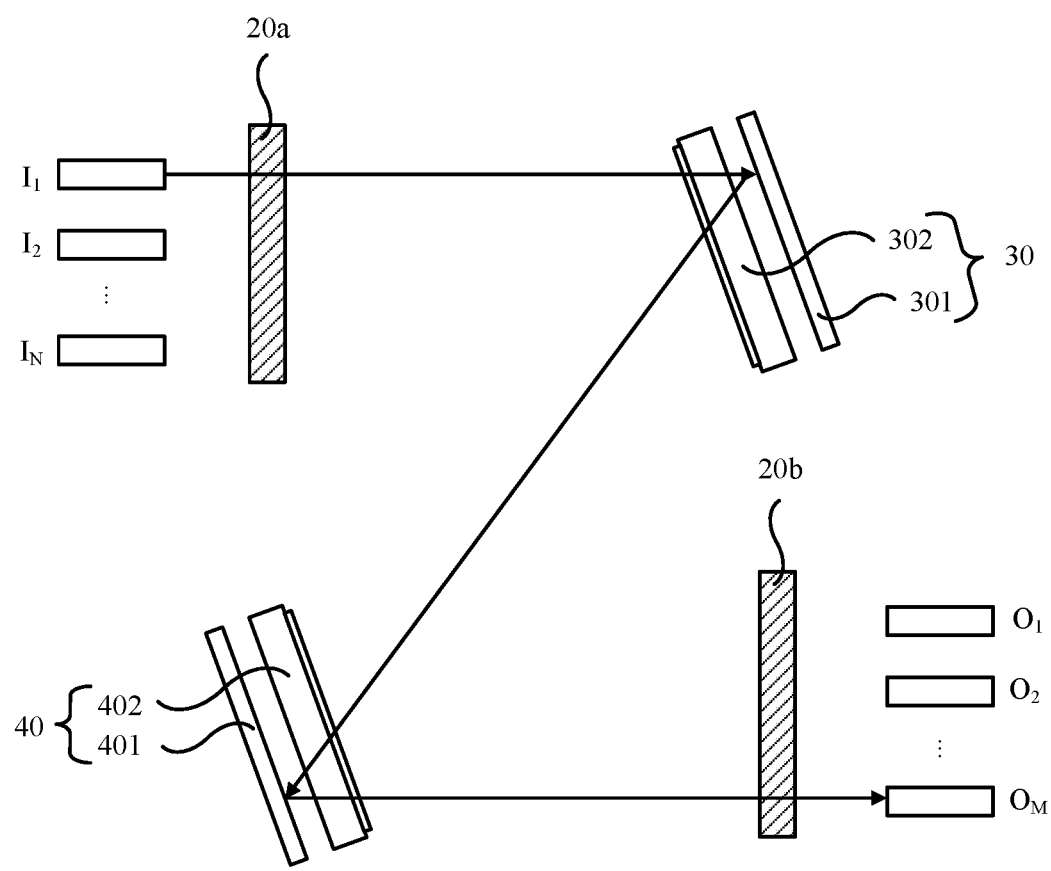
FIG. 7a is a schematic diagram of a structure and an optical path of an optical selective switch according to an embodiment of this application.

Similarly, when the output active deflection element 401 is also a reflection-type phase diffraction grating, as shown in FIG. 7a, the output passive deflection element 402 may be disposed on a light incident surface of the output active deflection element 401. The antireflective film 320 may alternatively be disposed between the output passive deflection element 402 and the output active deflection element 401.

It should be noted that, when the input active deflection element 301 and the output active deflection element 401 are reflection-type phase diffraction gratings, an optical path shown in FIG. 7a is closer to an actual optical path of the optical selective switch 100. FIG. 3a and drawings similar to FIG. 3a illustrate light deflection processes as principle diagrams, and these drawings do not limit whether the input active deflection element 301 and the output active deflection element 401 are transmission-type phase diffraction gratings or reflection-type phase diffraction gratings. Based on this, FIG. 7a is an optical path diagram of the optical selective switch 100. It can be learned that, optical signals of different wavelengths may be obtained through splitting after input light from an input port, for example, the input port $I_1$ passes through the input grating element 20a, and transmitted to the first switch structure 30. After passing through the input passive deflection element 302 in the first switch structure 30, the optical signals from the input grating element 20a are reflected by the input active deflection element 301, and emitted by the input passive deflection element 302 again. In this case, the input passive deflection element 302 and the input active deflection element 301 cooperate with each other to deflect the input light from the input grating element 20a to a direction corresponding to a target output end, and transmit the deflected optical signal to the second switch structure 40.

Next, after passing through the output passive deflection element 402 in the second switch structure 40, to-be-output light from the first switch structure 30 is reflected by the output active deflection element 401, and is emitted by the output passive deflection element 402 again. In this case, the output active deflection element 401 and the output passive deflection element 402 cooperate with each other to deflect the to-be-output light from the first switch structure 30 to a target output end, so that the deflected light is multiplexed to the target output port, for example, an output port $O_M$, after passing through the output grating element 20b.

Figure 7B:
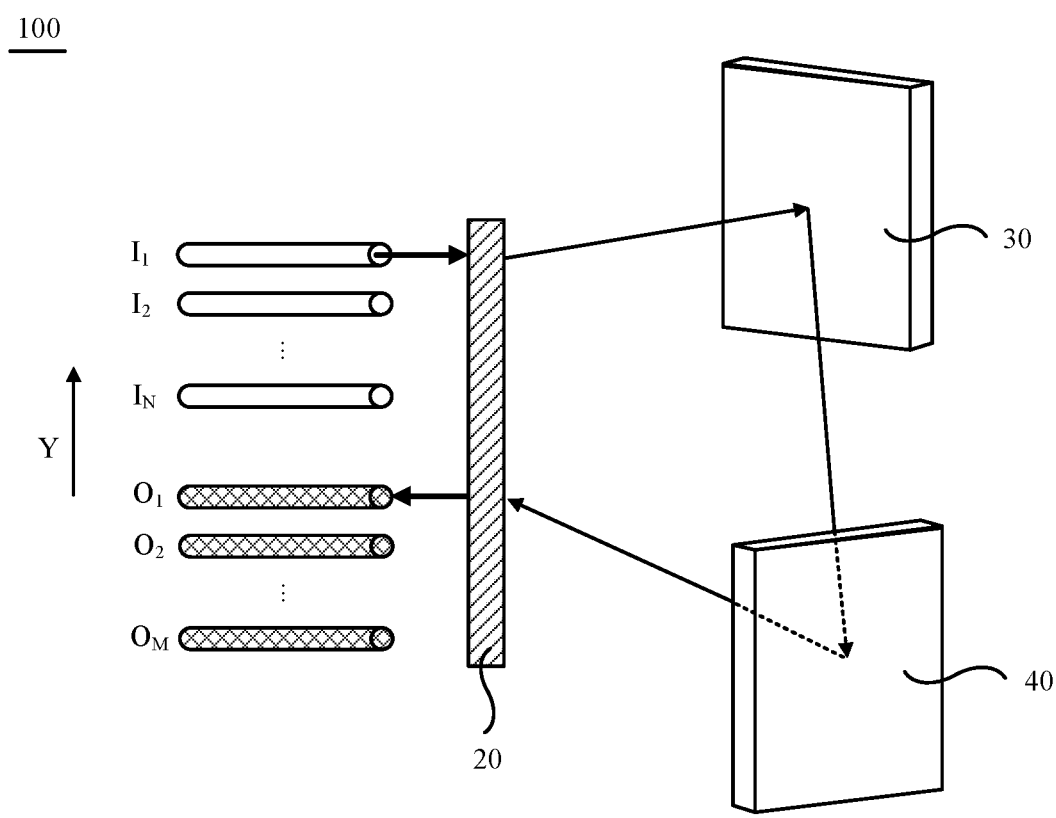
FIG. 7b is a schematic diagram of a structure and an optical path of an optical selective switch according to an embodiment of this application.

In addition, in some other embodiments of this application, the input grating element 20a and the output grating element 20b in the optical selective switch 100 may be physically integrated into a grating element 20 shown in FIG. 7b. This can simplify a structure of the optical selective switch 100, thereby reducing an insertion loss.

It can be learned from the foregoing description that, the input passive deflection element 302 and the output passive deflection element 402 may deflect some incident input light, thereby reducing both a maximum angle at which the input active deflection element 301 deflects the light and a maximum angle at which the output active deflection element 401 deflects the light. Structures of the input passive deflection element 302 and the output passive deflection element 402 are described in detail below by using examples.

Figure 8A:
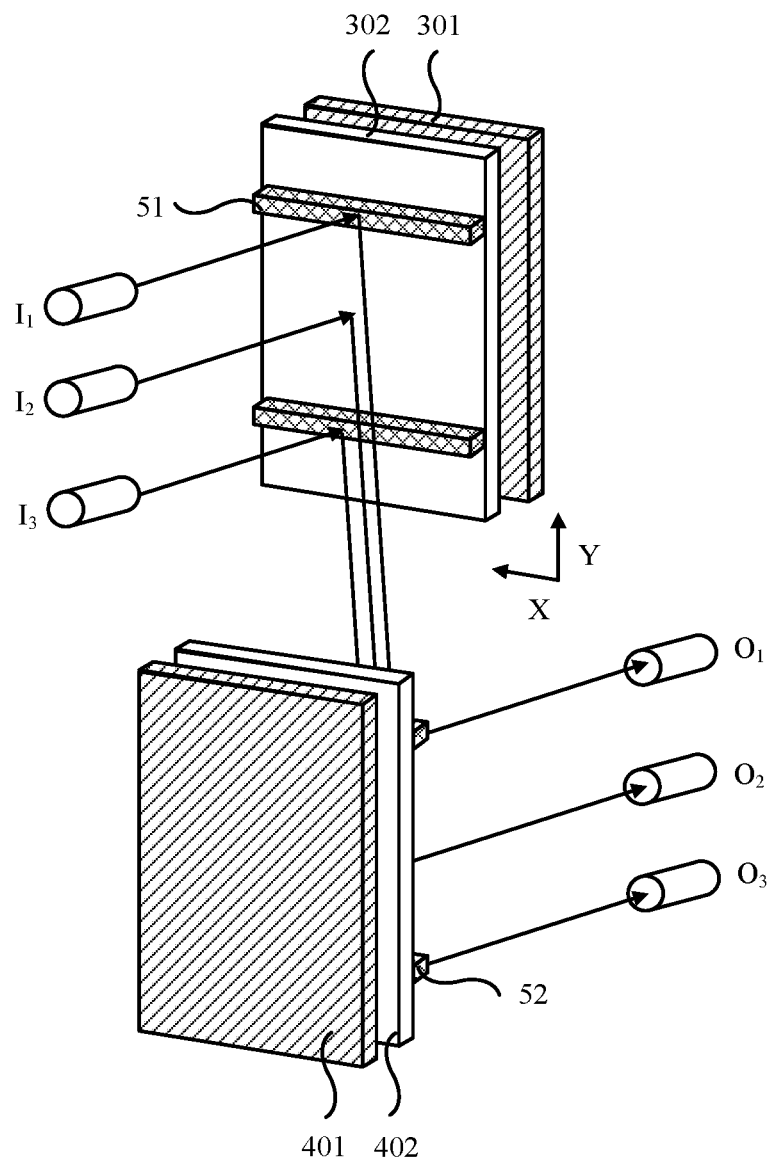

In some embodiments of this application, as shown in FIG. 8a, the input passive deflection element 302 includes a plurality of first prism structures 51 disposed side by side in a first direction Y. At least one of the N input ports ($I_1$, $I_2$, $I_3$, ..., and $I_N$) except an intermediate input port is in a one-to-one correspondence with the first prism structures 51. For example, when the optical selective switch 100 includes three (N=3) input ports: $I_1$, $I_2$, and $I_3$, the input port $I_1$ and the input port $I_3$ each correspond to one first prism structure 51 except the intermediate input port $I_2$.

When input light is a plurality of channels of light obtained through wavelength division multiplexing, the first prism structure 51 covers, in a second direction X, all wavelength channels of input light from an input port corresponding to the first prism structure 51. For example, a first prism structure 51 corresponding to the input port $I_1$ may cover, in the second direction X, all wavelength channels of input light from the input port $I_1$. A first prism structure 51 corresponding to the input port $I_3$ may cover, in the second direction X, all wavelength channels of input light from the input port $I_3$. Therefore, a length of a first prism structure 51 in the second direction X depends on a quantity of wavelength channels that are in an input port corresponding to the first prism structure 51 and that are used to transmit input light.

Figure 8B:
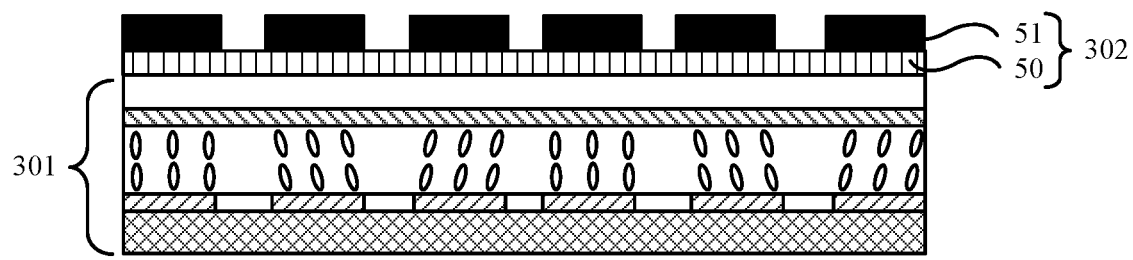

In some embodiments of this application, as shown in FIG. 8b, the input passive deflection element 302 may further include a bearing plate 50 configured to bear the first prism structure 51. The bearing plate 50 may be in direct contact with a side surface of the transparent cover plate 312 in the input active deflection element 301 away from the silicon substrate 311. The bearing plate 50 may be made of silicon oxide ($SiO_2$), and a thickness thereof may be approximately 1 mm. Alternatively, the antireflective film 320 may be disposed between the bearing plate 50 and the transparent cover plate 312 in the input active deflection element 301.

Figure 8C:
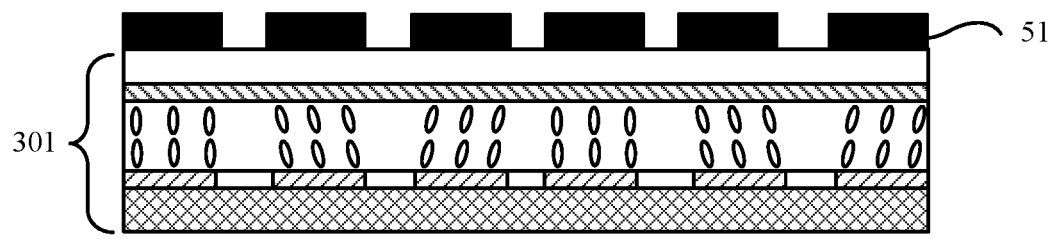

Alternatively, in some other embodiments of this application, as shown in FIG. 8c, the first prism structure 51 may be directly disposed on a side surface of the transparent cover plate 312 in the input active deflection element 301 away from the silicon substrate 311. In this way, the input active deflection element 301 and the input passive deflection element 302 can be preassembled together, thereby simplifying an optical element structure of the optical selective switch 100, reducing optical path complexity, installation and adjustment difficulty, and device costs, and improving device reliability.

In this case, the first prism structure 51 may be configured to deflect, to a direction corresponding to an intermediate output port by a first pretilt angle $\Delta\theta_1$, optical signals obtained by the input grating element 20a by splitting input light from an input port corresponding to the first prism structure 51. To reduce a difference between a maximum angle at which the input active deflection element 301 deflects an input port at an edge position, for example, the input port $I_1$ and the input port $I_3$, and a maximum angle at which the input active deflection element 301 deflects an input port at a middle position, for example, the intermediate input port $I_2$, first pretilt angles $\Delta\theta_1$ of the plurality of first prism structures 51 are gradually reduced in the first direction Y from an edge of the input passive deflection element 302 to its center.

In addition, as shown in FIG. 8a, the output passive deflection element 402 may include a plurality of second prism structures 52 disposed side by side in the first direction Y. At least one of the M output ports ($O_1$, $O_2$, $O_3$, . . . , and $O_M$) except an intermediate output port is in a one-to-one correspondence with the second prism structures 52. For example, when the optical selective switch 100 includes three (M=3) output ports: $O_1$, $O_2$, and $O_3$, the output port $O_1$ and the output port $O_3$ each correspond to one second prism structure 52 except the intermediate output port $O_2$.

Similarly, the second prism structure 52 covers, in the second direction X, all wavelength channels of to-be-output light from an output port corresponding to the second prism structure 52. For example, a second prism structure 52 corresponding to the output port $O_1$ may cover, in the second direction X, all wavelength channels of to-be-output light from the output port $O_1$. A second prism structure 52 corresponding to the output port $O_3$ may cover, in the second direction X, all wavelength channels of to-be-output light from the output port $O_3$. Therefore, a length of a second prism structure 52 in the second direction X depends on a quantity of wavelength channels that are in an output port corresponding to the second prism structure 52 and that are used to transmit to-be-output light.

The output passive deflection element 402 may further include a bearing plate 50 configured to bear the second prism structure 52. A manner in which the bearing plate 50 is disposed may be similar to that described above, and details are not described herein again. Alternatively, the second prism structure 52 may be directly disposed on a side surface of the transparent cover plate 312 in the output active deflection element 401 away from the silicon substrate 311.

In this case, the second prism structure 52 may be configured to deflect to-be-output light from the first switch structure 30, so that to-be-output light multiplexed by the grating 20b to an output port corresponding to the second prism structure 52 is deflected to a direction corresponding to the intermediate output port by a second pretilt angle $\Delta\theta_2$.

Based on this, to reduce a difference between a maximum angle at which the output active deflection element 401 deflects an output port at an edge position, for example, the output port $O_1$ and the output port $O_3$, and a maximum angle at which the output active deflection element 401 deflects an output port at a middle position, for example, the intermediate output port $O_2$, second pretilt angles $\Delta\theta_2$ of the plurality of second prism structures 52 are gradually reduced in the first direction Y from an edge of the output passive deflection element 402 to its center.

In some embodiments of this application, the quantity N of input ports may be the same as the quantity M of output ports. In this case, a first pretilt angle $\Delta\theta_1$ of a first prism structure 51 corresponding to the $k^{th}$ input port $I_k$ is equal to a second pretilt angle $\Delta\theta_2$ of a second prism structure corresponding to the $k^{th}$ output port Ok, where 1≤k≤N.

A manner of setting first pretilt angles $\Delta\theta_1$ of the plurality of first prism structures 51 in the input passive deflection element 302 and second pretilt angles $\Delta\theta_2$ of the plurality of second prism structures 52 in the output passive deflection element 402 is described below by using an example in which the quantity N of input ports is the same as the quantity M of output ports.

In some embodiments of this application, when N is an odd number, the first pretilt angle $\Delta\theta_1$ satisfies the following Formula (1):

$$\Delta\theta_1 = \theta \times |(\frac{N+1}{2} - k)| \qquad (1)$$

When N is an even number, the first pretilt angle $\Delta\theta_1$ satisfies the following Formula (2):

$$\Delta\theta_1 = \theta \times (\frac{N}{2} - k); 1 \leq k \leq (\frac{N}{2}) \qquad (2)$$

Alternatively, when N is an even number, the first pretilt angle $\Delta\theta_1$ satisfies the following Formula (3):

$$\Delta\theta_1 = \theta \times \left(k - \frac{N}{2} - 1\right); \left(\frac{N}{2} + 1\right) \leq k \leq N \qquad (3)$$

where k is a sequence number of the $k^{th}$ input port of the N input ports, and therefore k is an integer. It can be learned from the foregoing description that, when the angle θ is less than 10°, for example, approximately 5°, θ≈d/L. d is a distance between two adjacent input ports. L is an optical path distance between the first switch structure 30 and the second switch structure 40.

Figure 9A:
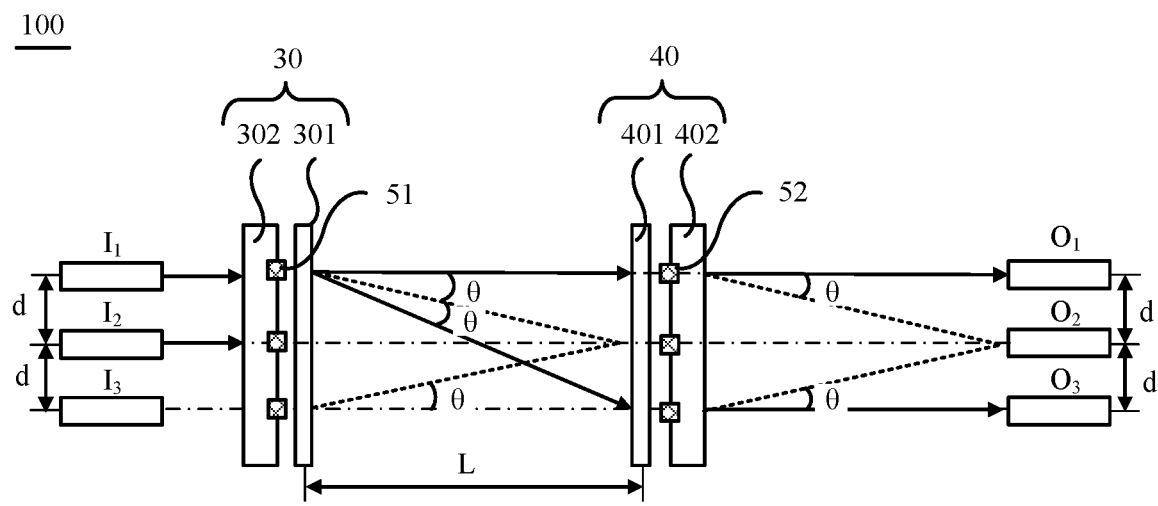
FIG. 9a is a schematic diagram of an optical path of an optical selective switch according to an embodiment of this application.

For example, as shown in FIG. 9a, when N=3, the following may be obtained based on Formula (1): A first pretilt angle $\Delta\theta_1$ of a first prism structure 51 corresponding to the first input port $I_1$ is θ, a first pretilt angle $\Delta\theta_1$ of a first prism structure 51 corresponding to the second input port $I_2$ is 0, and a first pretilt angle $\Delta\theta_1$ of a first prism structure 51 corresponding to the third input port $I_3$ is θ.

It can be learned from the foregoing description that, a first pretilt angle $\Delta\theta_1$ of a first prism structure 51 corresponding to the $k^{th}$ input port $I_k$ is equal to a second pretilt angle $\Delta\theta_2$ of a second prism structure corresponding to the $k^{th}$ output port $O_k$. Therefore, a second pretilt angle $\Delta\theta_2$ of a second prism structure 52 corresponding to the first output port $O_1$ is θ, a second pretilt angle $\Delta\theta_2$ of a second prism structure 52 corresponding to the second output port $O_2$ is 0, and a second pretilt angle $\Delta\theta_2$ of a second prism structure 52 corresponding to the third output port $O_3$ is θ.

Figure 9B:
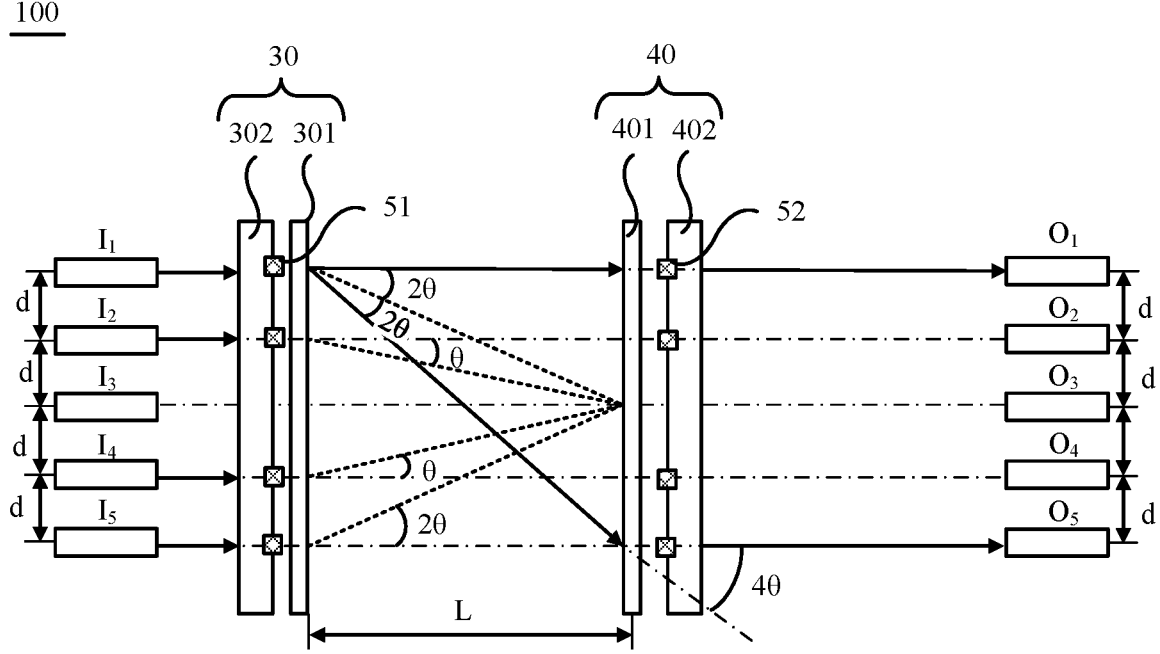
FIG. 9b is a schematic diagram of another optical path of an optical selective switch according to an embodiment of this application.

Alternatively, as shown in FIG. 9b, when N=5, the following may be obtained based on Formula (1): A first pretilt angle $\Delta\theta_1$ of a first prism structure 51 corresponding to the first input port $I_1$ is 2θ. In this case, when input light from the input port $I_1$ needs to be deflected to an output port $O_5$ as a target output port, the input active deflection element 301 only needs to deflect, based on a deflection angle of the first prism structure 51, the input light from the input port $I_1$ to the output port $O_5$ as the target output port by an angle that is approximately 2θ. In this way, a maximum deflection angle of the input active deflection element 301 is 2θ, so that the input light from the input port $I_1$ can be deflected to the output port $O_5$.

Based on this, if the second switch structure 40 is not provided, through joint deflection of the input active deflection element 301 and the first prism structure 51 corresponding to the input port $I_1$, the input light from the input port $I_1$ continues to be propagated in a dashed line direction shown in FIG. 9a, but cannot reach the output port $O_5$. However, in this embodiment of this application, it can be learned from the foregoing description that, a second pretilt angle $\Delta\theta_2$ of a second prism structure 52 that is in the output passive deflection element 402 and that is corresponding to the fifth output port $O_5$ is the same as a first pretilt angle $\Delta\theta_1$ of a first prism structure 51 corresponding to the fifth input port $I_5$, and each of the two pretilt angles is the angle 2θ. Therefore, the second prism structure 52 may deflect, upward by the angle 2θ, the light that is from the input port $I_1$ and that has passed through the input active deflection element 301 and the input passive deflection element 302. In this case, the output active deflection element 401 needs to deflect the light to the target output port $O_5$ based on the deflection of the second prism structure 52 in the output passive deflection element 402, that is, deflect the light upward by an angle 2θ, without a need to deflect the light upward by an angle 4θ.

In addition, the first pretilt angle $\Delta\theta_1$ of the first prism structure 51 corresponding to the second input port $I_2$ is θ, the first pretilt angle $\Delta\theta_1$ of the first prism structure 51 corresponding to the third input port $I_3$ is 0, a first pretilt angle $\Delta\theta_1$ of a first prism structure 51 corresponding to the fourth input port $I_4$ is θ, and the first pretilt angle $\Delta\theta_1$ of the first prism structure 51 corresponding to the fifth input port $I_5$ is 2θ. It can be learned from the foregoing description that, in this case, the maximum deflection angle of the input active deflection element 301 in the first switch structure 30 is 2θ. A manner of setting the second pretilt angle $\Delta\theta_2$ of the second prism structure corresponding to the $k^{th}$ output port $O_k$ is the same as that described above, and details are not described herein again. Similarly, it can be learned that, in this case, a maximum deflection angle of the output active deflection element 401 in the second switch structure 40 is 2θ.

Figure 9C:
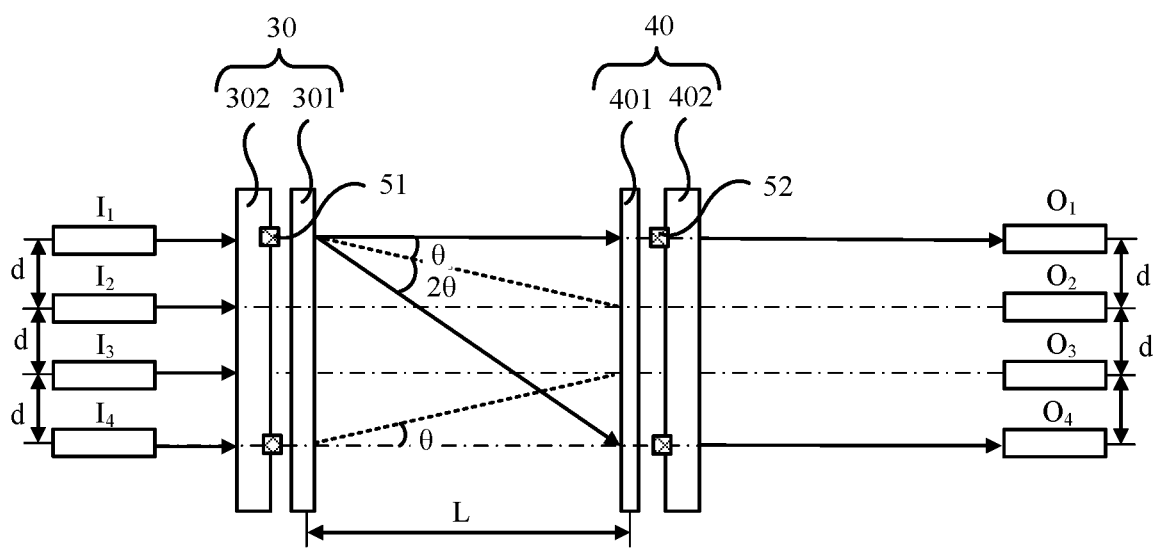
FIG. 9c is a schematic diagram of another optical path of an optical selective switch according to an embodiment of this application.

Alternatively, for another example, as shown in FIG. 9c, when N=4, the following may be obtained based on Formula (2) and Formula (3): A first pretilt angle $\Delta\theta_1$ of a first prism structure 51 corresponding to the first input port $I_1$ is θ, a first pretilt angle $\Delta\theta_1$ of a first prism structure 51 corresponding to the second input port $I_2$ is 0, a first pretilt angle $\Delta\theta_1$ of a first prism structure 51 corresponding to the third input port $I_3$ is 0, and a first pretilt angle $\Delta\theta_1$ of a first prism structure 51 corresponding to the fourth input port $I_4$ is θ. Similarly, it can be learned that, a maximum deflection angle of the input active deflection element 301 in the first switch structure 30 is 2θ. In addition, a manner of setting the second pretilt angle $\Delta\theta_2$ of the second prism structure corresponding to the $k^{th}$ output port $O_k$ is the same as that described above, and details are not described herein again. Similarly, it can be learned that, in this case, a maximum deflection angle of the output active deflection element 401 in the second switch structure 40 is 2θ.

Figure 9D:
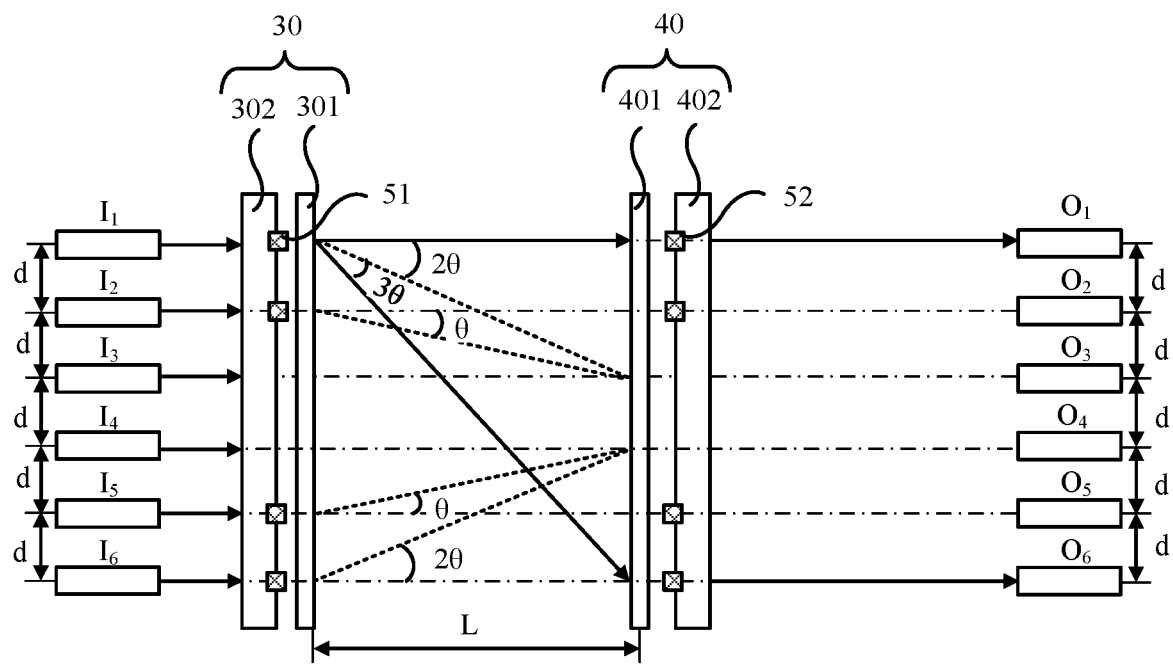
FIG. 9d is a schematic diagram of another optical path of an optical selective switch according to an embodiment of this application.

Alternatively, for another example, as shown in FIG. 9d, when N=6, the following may be obtained based on Formula (2) and Formula (3): A first pretilt angle $\Delta\theta_1$ of a first prism structure 51 corresponding to the first input port $I_1$ is 2θ, a first pretilt angle $\Delta\theta_1$ of a first prism structure 51 corresponding to the second input port $I_2$ is θ, a first pretilt angle $\Delta\theta_1$ of a first prism structure 51 corresponding to the third input port $I_3$ is 0, a first pretilt angle $\Delta\theta_1$ of a first prism structure 51 corresponding to the fourth input port $I_4$ is 0, a first pretilt angle $\Delta\theta_1$ of a first prism structure 51 corresponding to the fifth input port $I_5$ is θ, and a first pretilt angle $\Delta\theta_1$ of a first prism structure 51 corresponding to the sixth input port $I_6$ is 2θ. Similarly, it can be learned that, a maximum deflection angle of the input active deflection element 301 in the first switch structure 30 is 3θ. A manner of setting the second pretilt angle $\Delta\theta_2$ of the second prism structure corresponding to the $k^{th}$ output port $O_k$ is the same as that described above, and details are not described herein again. Similarly, it can be learned that, in this case, a maximum deflection angle of the output active deflection element 401 in the second switch structure 40 is 3θ.

Figure 10A:
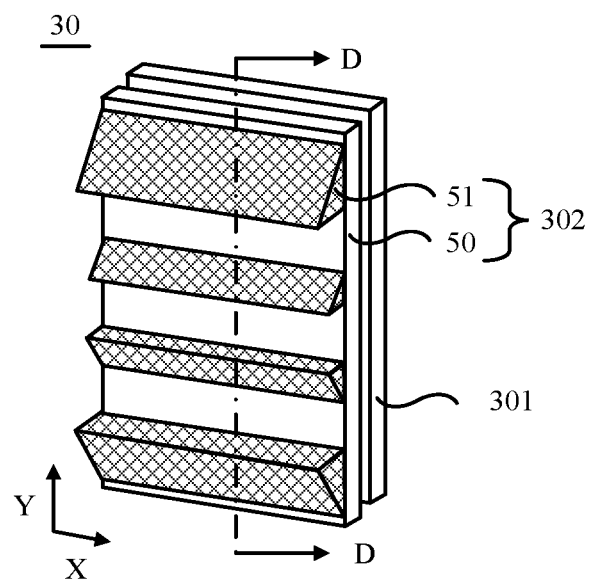
FIG. 10a is a schematic diagram of an optical path of a first switch structure according to an embodiment of this application.

A specific structure of the first prism structure 51 is described below. In this embodiment of this application, as shown in FIG. 10a, the first prism structure 51 includes a right-angled triangular prism in along strip shape. A length of the right-angled triangular prism in the long strip shape in a second direction X covers all wavelength channels in an input port corresponding to the right-angled triangular prism. The right-angled triangular prism may be made of at least one of $SiO_2$, titanium oxide ($TiO_2$), and silicon (Si), and a material of the right-angled triangular prism is not limited in this application.

Figure 10B:
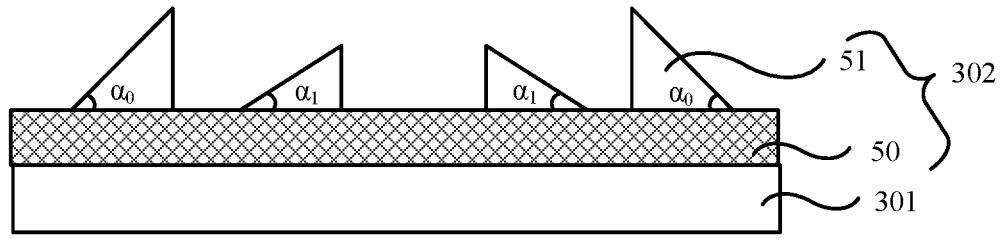

As shown in FIG. 10b (a sectional view obtained by sectioning along D-D in FIG. 10a), a cross section of the right-angled triangular prism in a direction perpendicular to the light incident surface of the input active deflection element 301 is a right triangle. There is a wedge angle, for example, a wedge angle $\alpha_0$ or a wedge angle $\alpha_1$, between a hypotenuse of the right triangle and the light incident surface of the input active deflection element 301.

Figure 10C:
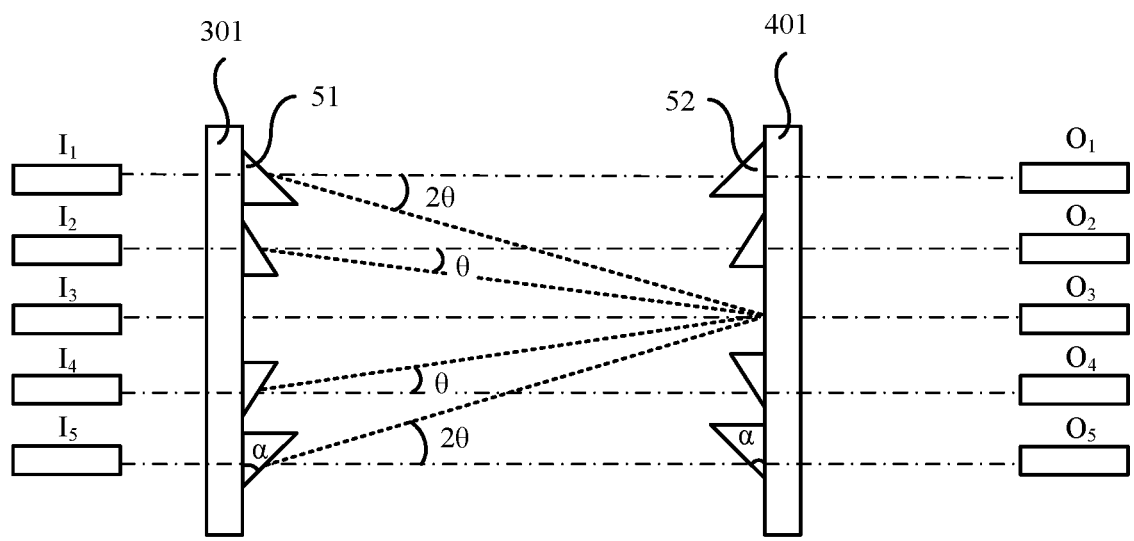

In this case, as shown in FIG. 10c, to enable the first prism structure 51 to deflect, to a direction corresponding to an intermediate output port by a first pretilt angle $\Delta\theta_1$, input light that is from an input port corresponding to the first prism structure 51 and that is obtained through splitting by the input grating element 20a, an opening of the wedge angle α faces toward a center of the input passive deflection element 302. In this way, after incident light incident to the first prism structure 51 passes through parts of the hypotenuse, phase distribution of light of different wavelengths in the incident light can change, and further the light can be deflected to the direction corresponding to the intermediate output port by the first pretilt angle $\Delta\theta_1$. In addition, to enable the first pretilt angles $\Delta\theta_1$ of the plurality of first prism structures 51 to be gradually reduced in the first direction Y from the edge of the input passive deflection element 302 to its center, wedge angles α of the plurality of first prism structures 51 are gradually reduced in the first direction Y from the edge of the input passive deflection element 302 to its center. For example, in FIG. 10b, the wedge angle (ii is smaller than the wedge angle $\alpha_0$.

It should be noted that, a position of the center of the input passive deflection element 302 may be a position of vertical projection of an intermediate input port of the N input ports on the input passive deflection element 302. Similarly, a position of a center of the output passive deflection element 402 may be a position of vertical projection of an intermediate output port of the M output ports on the output passive deflection element 402.

Figure 11A:
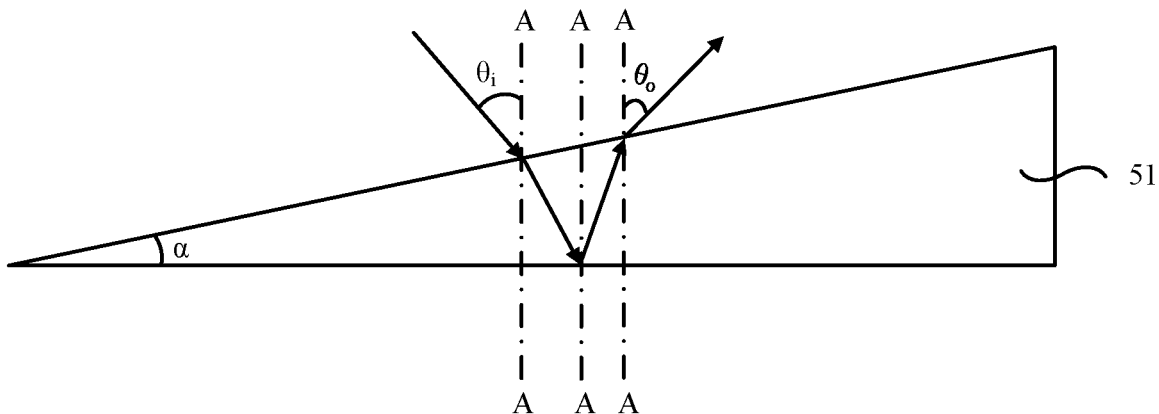
FIG. 11a is a schematic diagram of an optical path of a right-angled triangular prism in FIG. 10b.

A manner of setting a wedge angle α of each first prism structure 51 in the input passive deflection element 302 is described below. It can be learned from the foregoing description that, as shown in FIG. 11a, a cross section of the first prism structure 51 in a direction perpendicular to the light incident surface of the input active deflection element 301 is a right triangle. There is a wedge angle α between a hypotenuse of the right triangle and the light incident surface of the input active deflection element 301. In addition, the input active deflection element 301 is a reflection-type phase diffraction grating. Therefore, a light beam incident to the first prism structure 51 is reflected on a base of the right triangle shown in FIG. 11a.

Figure 11B:
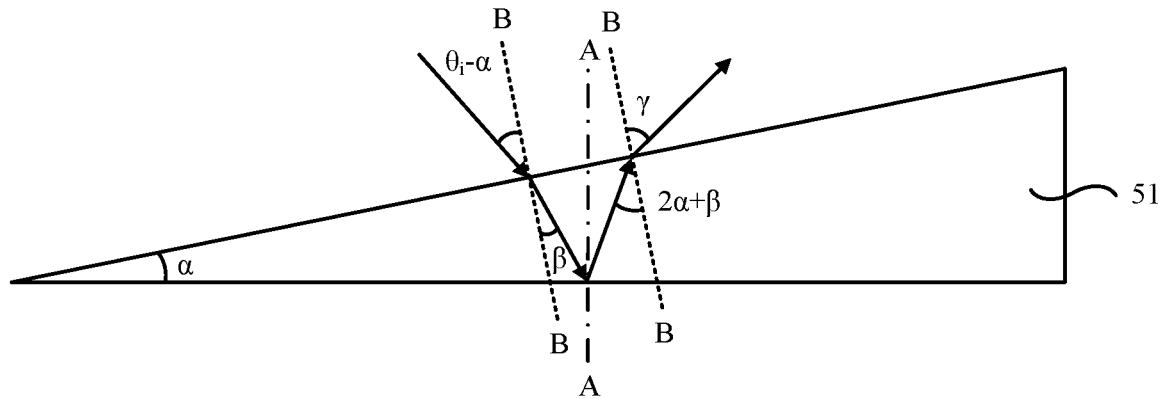
FIG. 11b is a schematic diagram of another optical path of the right-angled triangular prism in FIG. 10b.

In this case, as shown in FIG. 11a, the light beam is incident from the hypotenuse of the right triangle, and there is an included angle $\theta_i$ between the light beam as incident light and a normal line AA corresponding to the base of the right triangle. The included angle $\theta_i$ may be referred to as an incident angle of the light beam. Next, the incident light is refracted in the first prism structure 51. As shown in FIG. 11b, a refraction angle β of the incident light is an included angle between the incident light and a normal line BB corresponding to the hypotenuse.

Next, the light beam incident to the base of the right triangle is reflected by the base, and then refracted from the hypotenuse of the right triangle. In this case, as shown in FIG. 11a, there is an included angle $\theta_o$ between emergent light and the normal line AA corresponding to the base of the right triangle. The included angle $\theta_o$ may be referred to as an emergent angle of the light beam. In addition, as shown in FIG. 11b, an included angle between the emergent light and the normal line BB corresponding to the hypotenuse is a refraction angle γ of the emergent light. In this case, a first pretilt angle $\Delta\theta_1$ at which the first prism structure 51 deflects the light is a difference between the emergent angle $\theta_o$ of the light beam and the incident angle $\theta_i$ of the light beam, in other words, the first pretilt angle satisfies $\Delta\theta_1 = \theta_o - \theta_i$.

In this case, the following Formula (4) to Formula (6) may be obtained based on the refraction law of light (Snell's law) and a geometrical relationship:

$$\sin(\theta_i - \alpha) = n \sin \beta \tag{4}$$

$$n \sin(2\alpha + \beta) = \sin \gamma \tag{5}$$

$$\gamma - \alpha = \theta_o \tag{6}$$

A refractive index of the first prism structure 51 is n. Next, Formula (7) between the wedge angle α of the first prism structure 51 and the first pretilt angle $\Delta\theta_1$ may be obtained based on the foregoing Formula (4) to Formula (6).

$$\alpha \approx \Delta\theta_1/(2(n-1)) \tag{7}$$

Based on this, the foregoing Formula (1) is substituted into Formula (7), and it can be learned through calculation that, when N is an odd number, the wedge angle α satisfies the following Formula (8):

$$\alpha \approx \frac{\theta \times \left| \frac{N+1}{2} - k \right|}{2(n-1)} \tag{8}$$

The foregoing Formula (2) is substituted into Formula (7), and it can be learned through calculation that, when N is an even number, the first pretilt angle $\Delta\theta_1$ satisfies the following Formula (9):

$$\alpha \approx \frac{\theta \times \left| \frac{N}{2} - k \right|}{2(n-1)}; 1 \leq k \leq \left(\frac{N}{2}\right) \tag{9}$$

Alternatively, the foregoing Formula (3) is substituted into Formula (7), and it can be learned through calculation that, when N is an even number, the first pretilt angle $\Delta\theta_1$ satisfies the following Formula (10):

$$\alpha \approx \frac{\theta \times \left| k - \frac{N}{2} - 1 \right|}{2(n-1)}; \left(\frac{N}{2} + 1\right) \leq k \leq N \tag{10}$$

It can be learned from the foregoing description that, the input passive deflection element 302 may deflect, to a direction corresponding to an intermediate output port, input light that is from at least one of the N input ports ($I_1$, $I_2$, $I_3$, . . . , and $I_N$) except an intermediate input port and that is obtained through splitting by the input grating element 20a. Therefore, a first pretilt angle $\Delta\theta_1$ corresponding to a position that is on the input passive deflection element 302 and that is corresponding to the intermediate input port is 0. In this case, no first prism structure 51 may be disposed at the position that is on the input passive deflection element 302 and that is corresponding to the intermediate input port. In this way, light from the intermediate input port may not be deflected at the position that is on the input passive deflection element 302 and that is corresponding to the intermediate input port.

The foregoing description is provided by using the following examples: When N is an odd number, the $((N+1)/2)^{th}$ input port of the N input ports ($I_1$, $I_2$, $I_3$, . . . , and $I_N$) is the intermediate input port; and when N is an even number, the $(N/2)^{th}$ input port and the $(N/2+1)^{th}$ input port of the N input ports ($I_1$, $I_2$, $I_3$, . . . , and $I_N$) are both the intermediate input ports. In this case, it can be learned from Formula (8) and Formula (9) that, when N is an odd number, for example, when N=5, the third input port $I_3$ is the intermediate input port. No first prism structure 51 may be disposed at a position that is on the input passive deflection element 302 and that is corresponding to the intermediate input port $I_3$.

In addition, wedge angles α of first prism structures 51 that are in the input passive deflection element 302 and that are corresponding to the input port $I_2$ and the input port $I_4$ located on both sides of the intermediate input port $I_3$ and adjacent to the intermediate input port $I_3$ are quite small and close to 0. Because process precision and difficulty of manufacturing the first prism structure 51 with a wedge angle α close to 0 are relatively high, to simplify a manufacturing process and reduce manufacturing difficulty, no first prism structures 51 may be disposed at positions that are on the input passive deflection element 302 and that are corresponding to the input port $I_2$ and the input port $I_4$.

In this case, in addition to the intermediate input ports in the following examples: when N is an odd number, the $((N+1)/2)^{th}$ input port of the N input ports ($I_1$, $I_2$, $I_3$, . . . , and $I_N$) is the intermediate input port; and when N is an even number, the $(N/2)^{th}$ input port and the $(N/2+1)^{th}$ input port of the N input ports ($I_1$, $I_2$, $I_3$, . . . , and $I_N$) are the intermediate input ports, the intermediate input port may further include the $k^{th}$ input port satisfying the following Formula (11):

$$\left| \frac{N+1}{2} - k \right| \leq \frac{N}{4} \tag{11}$$

In this way, no first prism structure 51 may be disposed at a position that is on the input passive deflection element 302 and that is corresponding to the $k^{th}$ input port satisfying Formula (11), so that a first pretilt angle $\Delta\theta_1$ of the input passive deflection element 302 relative to the $k^{th}$ input port satisfying Formula (11) is 0.

It can be learned from the foregoing description that, when the quantity N of input ports is the same as the quantity M of output ports, a first pretilt angle $\Delta\theta_1$ of a first prism structure 51 that is in the input passive deflection element 302 and that is corresponding to the $k^{th}$ input port $I_k$ is equal to a second pretilt angle $\Delta\theta_2$ of a second prism structure 52 that is in the output passive deflection element 402 and that is corresponding to the $k^{th}$ output port $O_k$. Therefore, a wedge angle $\alpha$ of the first prism structure 51 that is in the input passive deflection element 302 and that is corresponding to the $k^{th}$ input port $I_k$ is equal to a wedge angle $\alpha$ of the second prism structure 52 that is in the output passive deflection element 402 and that is corresponding to the $k^{th}$ output port $O_k$. In this case, a plurality of first prism structures 51 in the input passive deflection element 302 and a plurality of second prism structures 52 in the output passive deflection element 402 may be arranged in a mirror mode with respect to a center line (perpendicular to the direction of the optical path) of an optical path between the input passive deflection element 302 and the output passive deflection element 402.

Therefore, in addition to the intermediate output ports in the following examples: when M is an odd number, the $((M+1)/2)^{th}$ output port of the M output ports ($O_1$, $O_2$, $O_3$, . . . , and $O_M$) is the intermediate output port; and when M is an even number, the $(M/2)^{th}$ output port and the $(M/2+1)^{th}$ output port of the M output ports ($O_1$, $O_2$, $O_3$, . . . , and $O_M$) are the intermediate output ports, the intermediate output port may further include the $k^{th}$ output port satisfying the following Formula (12):

$$\left|\frac{M+1}{2} - k\right| \le \frac{M}{4} \quad (12)$$

In this way, no second prism structure 52 may be disposed at a position that is on the output passive deflection element 402 and that is corresponding to the $k^{th}$ output port satisfying Formula (12), so that a second pretilt angle $\Delta\theta_2$ of the output passive deflection element 402 relative to the $k^{th}$ output port satisfying Formula (12) is 0. In addition, a process of calculating a wedge angle $\alpha$ of a second prism structure 52 that is in the output passive deflection element 402 and that is corresponding to an output port that is not an intermediate output port may be similar to that described above, and details are not described herein again.

It should be noted that, the structures of the input passive deflection element 302 and the output passive deflection element 402 are described above with reference to the case in which the quantity N of input ports and the quantity M of output ports in the optical selective switch 100 are the same. In some other embodiments of this application, the quantity N of input ports and the quantity M of output ports in the optical selective switch 100 are different. In this case, a wedge angle $\alpha$ of each second prism structure 52 in the output passive deflection element 402 needs to be set separately depending on the quantity M and positions of output ports, and a setting process thereof may be similar to a manner of setting a wedge angle $\alpha$ of the first prism structure 51 in the input passive deflection element 302, and details are not described herein again.

In some other embodiments of this application, the input passive deflection element 302 may include a plurality of first prism structures 51 disposed side by side in the first direction Y. At least one of the N input ports ($I_1$, $I_2$, $I_3$, . . . , and $I_N$) except an intermediate input port is in a one-to-one correspondence with the first prism structures 51. The output passive deflection element 402 may include a plurality of second prism structures 52 disposed side by side in the first direction Y. At least one of the M output ports ($O_1$, $O_2$, $O_3$, . . . , and $O_M$) except an intermediate output port is in a one-to-one correspondence with the second prism structures 52.

Figure 12A:
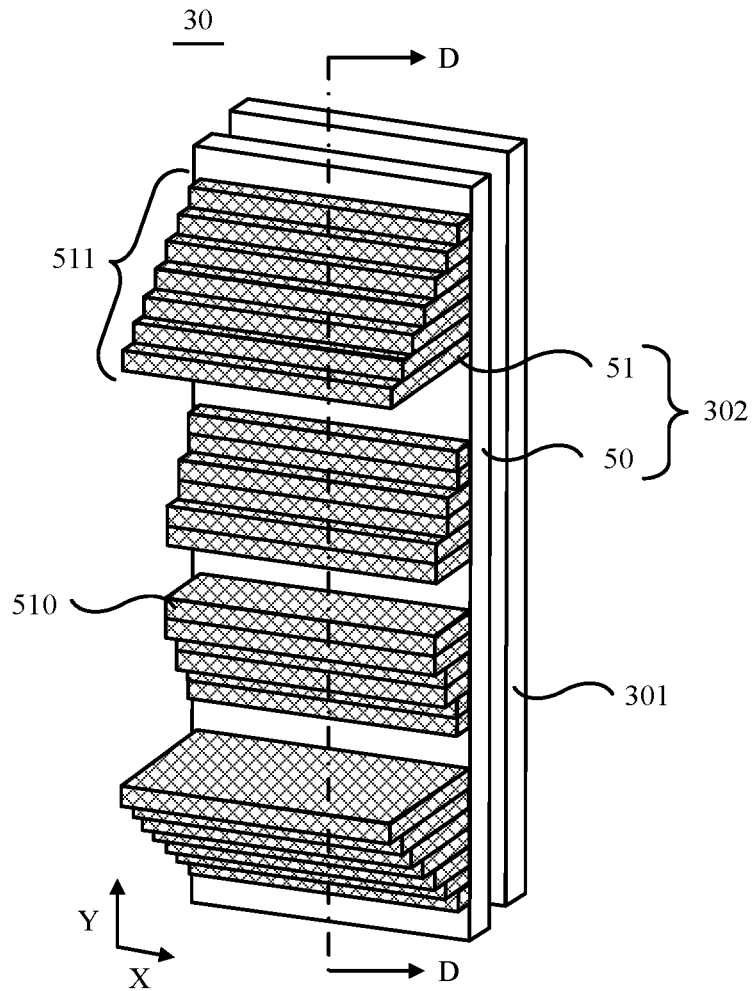
FIG. 12a is a schematic diagram of another optical path of a first switch structure according to an embodiment of this application.
Figure 12B:
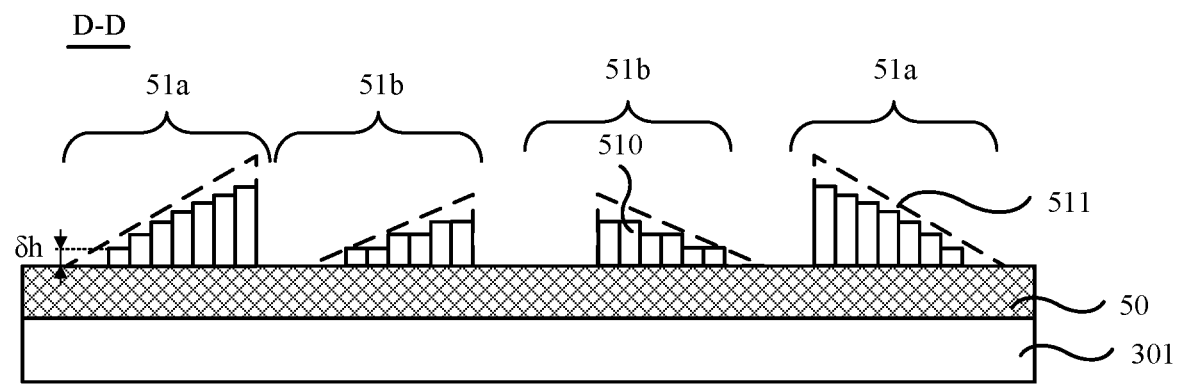

A difference from the foregoing example lies in that, the first prism structure 51 includes at least one dimming structure 511 shown in FIG. 12a. A range for performing phase modulation on an optical signal by using each dimming structure 511 may be 0-2π. In this case, each dimming structure 511 may include a plurality of quadrangular prisms 510 disposed side by side in the first direction Y As shown in FIG. 12b (a sectional view obtained by sectioning along a dashed line D-D in FIG. 12a), a cross section of a quadrangular prism 510 in a direction perpendicular to the light incident surface of the input active deflection element 301 is a rectangle. A length of any side of the rectangle may be less than a minimum wavelength of an incident optical signal. For example, when a minimum wavelength of an optical signal from an input port corresponding to a first prism structure 51 in which the rectangle is located is 1.5 μm, an area of the rectangle may be 1 μm×1 μm, so that a phase of the optical signal can be effectively adjusted.

In addition, to ensure that the first prism structure 51 covers, in a second direction X shown in FIG. 12a, all wavelength channels of a light beam from an input port I corresponding to the first prism structure 51, lengths of a plurality of strip-shaped quadrangular prisms 510 in one first prism structure 51 in a second direction X all cover all wavelength channels of an input port corresponding to the first prism structure 51. The quadrangular prism 510 may be made of at least one of $SiO_2$, $TiO_2$, and Si, and a material of the quadrangular prism 510 is not limited in this application.

On this basis, to ensure that a range for performing phase modulation on an optical signal by using each dimming structure 511 is 0-2π, there may be quadrangular prisms of Q height levels in a plurality of (for example, 20) quadrangular prisms in each dimming structure 511 in any first prism structure (for example, a first prism structure 51a or a first prism structure 51b in FIG. 12b). 2≤Q, and Q is an integer. A quadrangular prism of each height level may be configured to modulate a phase of an optical signal in the phase modulation range (for example, 0-2π). A height direction of the quadrangular prism is parallel to a direction perpendicular to the light incident surface of the input active deflection element 301.

For example, as shown in FIG. 12b, there may be quadrangular prisms of eight (for example, Q=8) different height levels in each dimming structure 511 in any first prism structure (for example, the first prism structure 51a or the first prism structure 51b in FIG. 12b). The eight height levels are respectively 0×δh, 1×δh, . . . , and 7×δh. δh is a minimum step interval. The quadrangular prisms of the eight height levels (0×δh, 1×δh, . . . , and 7×δh) may be configured to respectively modulate phases of 0π, ⅛π, . . . , and ⅞π of an optical signal in the phase modulation range (for example, 0-2π).

In this case, a larger quantity Q of height levels of quadrangular prisms in each dimming structure 511 in a first prism structure (for example, the first prism structure 51a or the first prism structure 51b in FIG. 12b) leads to higher precision of performing phase adjustment on an optical signal by using the first prism structure. Herein, only Q=8 is used as an example for description. Alternatively, a value of Q may be set based on a requirement of phase adjustment precision to select a height of a quadrangular prism in the first prism structure 51 and a length of any side of a rectangular cross section of the quadrangular prism, to achieve optimal diffraction efficiency.

As shown in FIG. 12b, in a dimming structure 511 in the first prism structure 51a, quadrangular prisms of Q (for example, Q=8) height levels are used. In a dimming structure 511 of the first prism structure 51b that is adjacent to the first prism structure 51a and that is close to the center of the input passive deflection element 302, only quadrangular prisms of four of Q (for example, Q=8) height levels are used. A quantity of height levels that can be used in the dimming structure 511 is less than Q. A quantity of height levels that can be used in each dimming structure 511 is not limited in this application.

On this basis, to implement that the first pretilt angles $\Delta\theta_1$ of the plurality of first prism structures 51 are gradually reduced in the first direction Y from the edge of the input passive deflection element 302 to its center, height change rates of the plurality of quadrangular prisms in the dimming structure 511 of the first prism structure are gradually reduced in the first direction Y from the edge of the input passive deflection element 302 to its center, as shown in FIG. 12b. In this way, the height change rates of the plurality of quadrangular prisms are proportional to the first pretilt angle $\Delta\theta_1$.

For example, in FIG. 12b, for the plurality of quadrangular prisms of different heights in the dimming structure 511 of the first prism structure 51a, a height change thereof may be increasing by δh for each prism on average. For the plurality of quadrangular prisms of different heights in the dimming structure 511 of the first prism structure 51b that is adjacent to the first prism structure 51a and that is close to the center of the input passive deflection element 302, a height change thereof may be increasing by 0.5×δh for each prism on average.

In addition, widths (parallel to the first direction Y) of light beams incident to all the first prism structures 51 are approximately the same. Therefore, to simplify a manufacturing process, quadrangular prisms with a same width (parallel to the first direction Y) are manufactured, and quantities of quadrangular prisms in all the first prism structures 51 may be the same. Certainly, in some other embodiments of this application, the quantities of quadrangular prisms in all the first prism structures 51 may alternatively be different.

In this case, quadrangular prisms in at least one dimming structure 511 in the first prism structure 51 in this example may form a structure having a stepped surface. This can implement wavefront phase modulation that is performed on an optical signal and that is the same as wavefront phase modulation in the foregoing example that is performed by using one strip-shaped triangular prism corresponding to a same input port I as the quadrangular prisms. In a process of designing and manufacturing the first prism structure 51, to implement the wavefront phase modulation that is the same as that in the foregoing example, correspondingly, at a position that is corresponding to the strip-shaped triangular prism and that is in the first prism structure 51 in this example, a step height H of the quadrangular prisms in the dimming structure 511 in the first prism structure 51 may satisfy the following formula:

$$H=[\{L/\lambda\}\times 8]\times \delta h \quad (13)$$

where the mathematical symbol "[ ]" in Formula (13) represents rounding of a calculation result of an expression in a parenthesis; the mathematical symbol "{ }" represents obtaining a decimal part of a calculation result of an expression in a parenthesis; L represents an optical path difference obtained when an optical signal is incident to, completely passes through, and is emitted from quadrangular prisms in a dimming structure 511 in a first prism structure 51; and k represents a wavelength of the optical signal.

It should be noted that, in both FIG. 12a and FIG. 12b, descriptions are provided by using an example in which the first prism structure 51 includes one dimming structure 511. In some other embodiments of this application, when a phase modulation range required by the first prism structure 51 is 0−w×π, where w is a real number and w>2, as shown in FIG. 12c, the first prism structure 51 may include one or more dimming structures 511, and a phase modulation range of each dimming structure 511 is 0-2π.

Figure 12C:
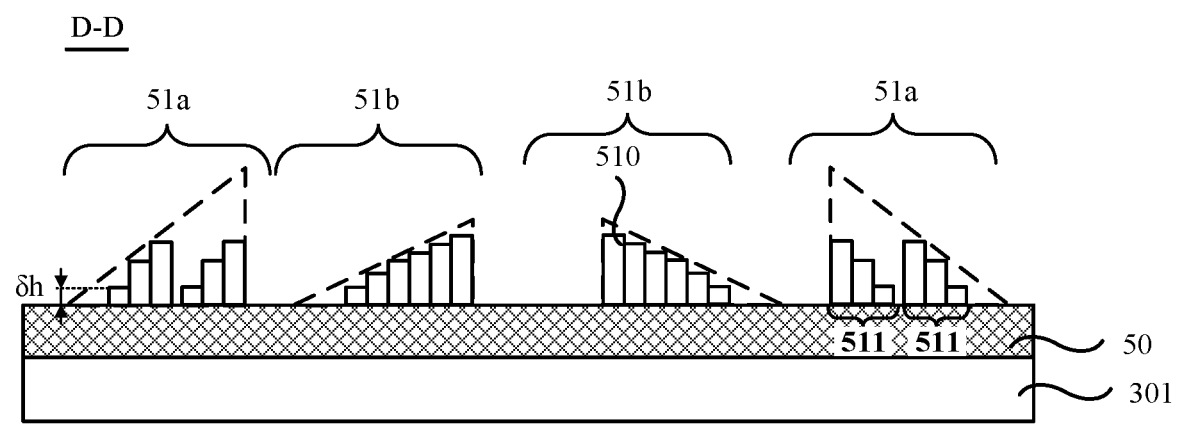

For example, as shown in FIG. 12c, in each dimming structure 511 of a first prism structure 51a at an edge position, only quadrangular prisms of four of Q (for example, Q=8) height levels are used. In a dimming structure 511 of a first prism structure 51b that is adjacent to the first prism structure 51 and that is close to the center of the input passive deflection element 302, only quadrangular prisms of Q (for example, Q=8) height levels are used.

In conclusion, in this example, a dimming structure 511 in each first prism structure 51 may include a plurality of strip-shaped quadrangular prisms 510. In this case, a surface of each quadrangular prism 510 away from the input active deflection element 301 is planar. When a first pretilt angle $\Delta\theta_1$ of a first prism structure 51 needs to be adjusted, only heights of quadrangular prisms 510 in the first prism structure 51 need to be adjusted. In this way, in this example and the foregoing example, wavefront phase modulation implemented by the first prism structures 51 corresponding to a same input port I are the same as that implemented by using one strip-shaped triangular prism in the foregoing example.

However, when a wedge angle α of the first prism structure 51 is slightly changed, compared with adjustment of a tilt angle of a hypotenuse of a right-angled triangular prism in the foregoing example, in a manufacturing process, it is easier to implement adjustment of the heights of the quadrangular prisms 510 in this example. In this way, processing difficulty of the first prism structure 51 can be reduced, and the input passive deflection element 302 can have better mechanical strength and stability.

In a process of manufacturing the input passive deflection element 302, the strip-shaped quadrangular prisms 510 may be manufactured by using a photolithography process on a bearing plate 50 mainly composed of $SiO_2$. Alternatively, the strip-shaped quadrangular prisms 510 may be manufactured, on a side surface of the transparent cover plate 312 in the input active deflection element 301 away from the silicon substrate 311, through precise alignment by using a micro-nano machining device.

In addition, when the quantity N of input ports is the same as the quantity M of output ports, sizes and distribution of quadrangular prisms in a dimming structure 511 of the first prism structure 51 that is in the input passive deflection element 302 and that is corresponding to the $k^{th}$ input port $I_k$ are the same as those of quadrangular prisms in a dimming structure 511 of the second prism structure 52 that is in the output passive deflection element 402 and that is corresponding to the $k^{th}$ output port $O_k$. A manner in which the second prism structure 52 is disposed is the same as that described above, and details are not described herein again.

When the quantity N of input ports is different from the quantity M of output ports, sizes and distribution of quadrangular prisms in a dimming structure 511 of each second prism structure 52 in the output passive deflection element 402 need to be separately set based on the quantity M and positions of output ports. A setting process thereof may be similar to a manner of setting the dimming structure 511 of the first prism structure 51 in the input passive deflection element 302, and details are not described herein again.

In some other embodiments of this application, the input passive deflection element 302 may include a plurality of first prism structures 51 disposed side by side in the first direction Y. At least one of the N input ports ($I_1$, $I_2$, $I_3$, . . . , and $I_N$) except an intermediate input port is in a one-to-one correspondence with the first prism structures 51. The output passive deflection element 402 may include a plurality of second prism structures 52 disposed side by side in the first direction Y. At least one of the M output ports ($O_1$, $O_2$, $O_3$, . . . , and $O_M$) except an intermediate output port is in a one-to-one correspondence with the second prism structures 52.

Figure 13A:
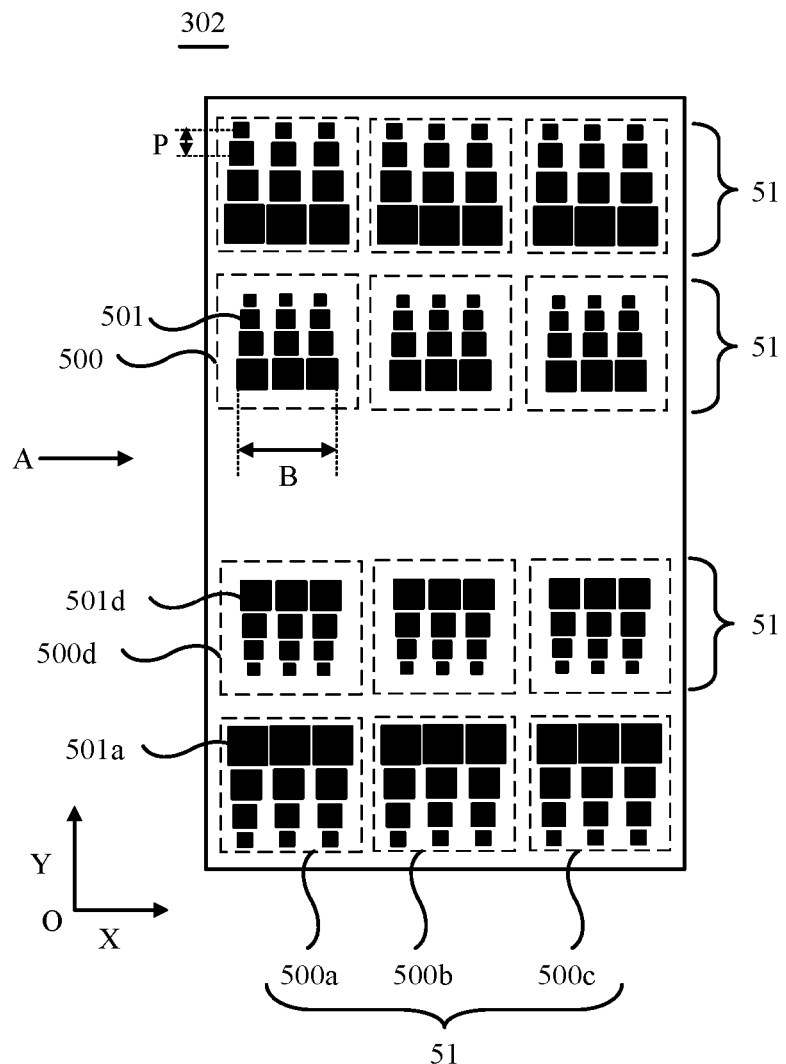
FIG. 13a is a schematic diagram of a structure of an input passive deflection element according to an embodiment of this application.

A difference from the foregoing example lies in that, as shown in FIG. 13*a*, the first prism structure 51 includes S metasurface structures 500 disposed side by side in the second direction X. A range for performing phase modulation on an optical signal by using each metasurface structure 500 is 0-2π. All wavelength channels covered by the first prism structure 51 in the second direction X are classified into S bands. Each metasurface structure 500 corresponds to one band, where S≥2, and S is an integer. A smaller length B of each metasurface structure 500 in the second direction X indicates a smaller length of a band corresponding to the metasurface structures 500 and a larger value of S.

For example, when 60 wavelength channels are covered by the first prism structure 51 in the second direction X, a metasurface structure 500*a* may correspond to wavelengths numbered 0-20. The metasurface structure 500*a* can deflect an optical signal whose wavelength is in a range of the wavelengths numbered 0-20 to a direction corresponding to the intermediate output port by a first pretilt angle $\Delta\theta_1$. A metasurface structure 500*b* may correspond to wavelengths numbered 21-40. The metasurface structure 500*b* can deflect an optical signal whose wavelength is in a range of the wavelengths numbered 21-40 to the direction corresponding to the intermediate output port by the first pretilt angle $\Delta\theta_1$. A metasurface structure 500*c* may correspond to wavelengths numbered 41-60. The metasurface structure 500*c* can deflect an optical signal whose wavelength is in a range of the wavelengths numbered 41-60 to the direction corresponding to the intermediate output port by the first pretilt angle $\Delta\theta_1$.

Each metasurface structure 500 may include a plurality of nano-microcolumns 501 arranged in an array. The nano-microcolumn 501 may be made of Si, and a material of the nano-microcolumn 501 is not limited in this application. A distance P between two adjacent nano-microcolumns 501 in the first direction Y may be smaller than a center wavelength of a band corresponding to the metasurface structure 500. For example, a distance P (for example, approximately 500 nm) between two adjacent nano-microcolumns 501 in the metasurface structure 500*b* is smaller than a center wavelength of wavelengths numbered 21-40 of a band corresponding to the metasurface structure 500*b*, that is, a wavelength numbered 30 (for example, approximately 1550 nm). A smaller distance P leads to higher precision of performing phase adjustment on an optical signal by using the first prism structure 51.

In addition, area change rates of cross sections of nano-microcolumns 501 in a same row in each metasurface structure 500 are gradually reduced in the first direction Y from the edge of the input passive deflection element 302 to its center, so that area changes of the cross sections of the nano-microcolumns 501 are proportional to the first pretilt angle $\Delta\theta_1$. For example, in the first direction Y from the edge of the input passive deflection element 302 to its center, an average change rate of cross-sectional areas of the metasurface structure 500*a* is greater than an average change rate of cross-sectional areas of a metasurface structure 500*d*. The cross sections are parallel to the light incident surface (for example, an XOY surface in FIG. 13*a*) of the input active deflection element 301.

It should be noted that, in FIG. 13*a*, a description is provided by using an example in which the first prism structure 51 includes a metasurface structure 500 in the first direction Y In some other embodiments of this application, when a phase modulation range required by the first prism structure 51 is 0–w×π, where w is a real number and w>2, the first prism structure 51 may include one or more metasurface structures 500 in the first direction Y, and a phase modulation range of each metasurface structure 500 is 0-2π.

In addition, widths (parallel to the first direction Y) of light beams incident to all the first prism structures 51 are approximately the same. Therefore, to simplify a manufacturing process, nano-microcolumns 501 with a same cross-sectional area are manufactured, and quantities of nano-microcolumns 501 in all the first prism structures 51 may be the same. Certainly, in some other embodiments of this application, the quantities of nano-microcolumns 501 in all the first prism structures 51 may alternatively be different.

Figure 13B:
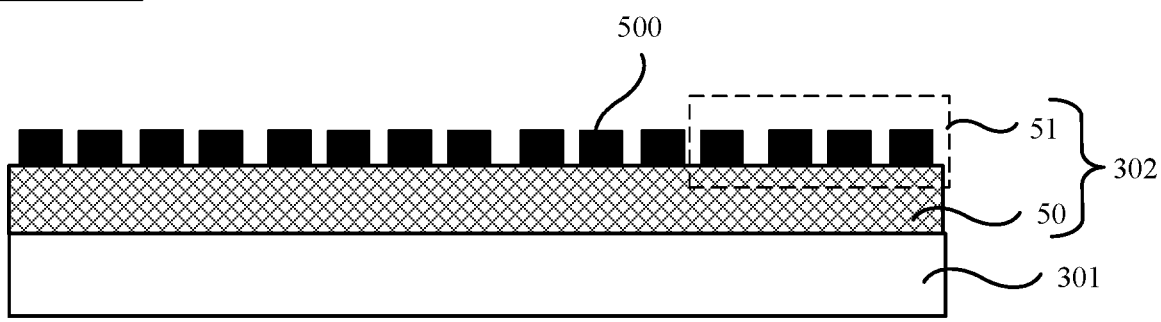
Figure 13C:
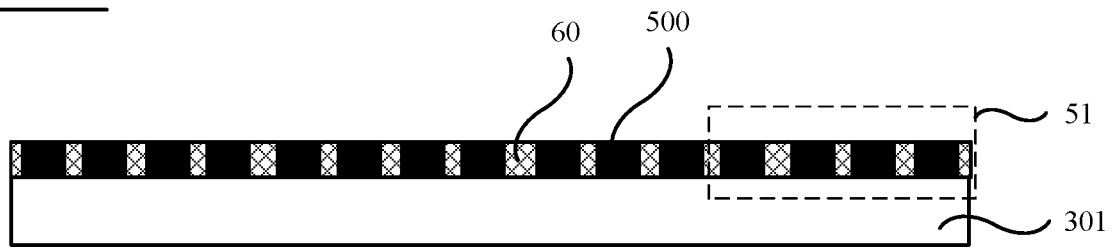

In this example, wavefront phase modulation implemented by using nano-microcolumns 501 with different cross-sectional areas in the metasurface structure 500 of the first prism structure 51 are the same as that implemented by using one strip-shaped triangular prism in the foregoing example. In addition, as shown in FIG. 13*b* (a view obtained along a direction A in FIG. 13*a*), heights of nano-microcolumns 501 in each first prism structure 51 are the same, so that a side surface of the input passive deflection element 302 away from the input active deflection element 301 tends to be flat. This facilitates surface attachment or gluing between the input passive deflection element 302 and another optical element. Air may be filled between two adjacent nano-microcolumns 501. Alternatively, as shown in FIG. 13*c*, a flat layer 60 made of an organic material is filled between two adjacent nano-microcolumns 501.

In a process of manufacturing the input passive deflection element 302, the nano-microcolumns 501 arranged periodically may be manufactured by a photolithography process or a nano-imprinting process on a bearing plate 50 mainly composed of $SiO_2$. Alternatively, the nano-microcolumns 501 arranged periodically may be manufactured, on a side surface of the transparent cover plate 312 in the input active deflection element 301 away from the silicon substrate 311, through precise alignment by using a micro-nano machining device.

In addition, processes of manufacturing metasurface structures in first prism structures 51 at different positions in the input passive deflection element 302 are the same as that described above, and details are not described herein again.

In addition, when the quantity N of input ports is the same as the quantity M of output ports, distribution of nano-microcolumns 501 in a metasurface structure 500 of the first prism structure 51 that is in the input passive deflection element 302 and that is corresponding to the $k^{th}$ input port $I_k$ is the same as that of nano-microcolumns 501 in a metasurface structure 500 of the second prism structure 52 that is in the output passive deflection element 402 and that is corresponding to the $k^{th}$ output port $O_k$.

When the quantity N of input ports is different from the quantity M of output ports, distribution of nano-microcolumns 501 in a metasurface structure of each second prism structure 52 in the output passive deflection element 402 needs to be separately set based on the quantity M and positions of output ports. A setting process thereof may be similar to a distribution setting manner of the nano-microcolumns 501 in the metasurface structure of the first prism structure 51 in the input passive deflection element 302, and details are not described herein again.

Figure 14A:
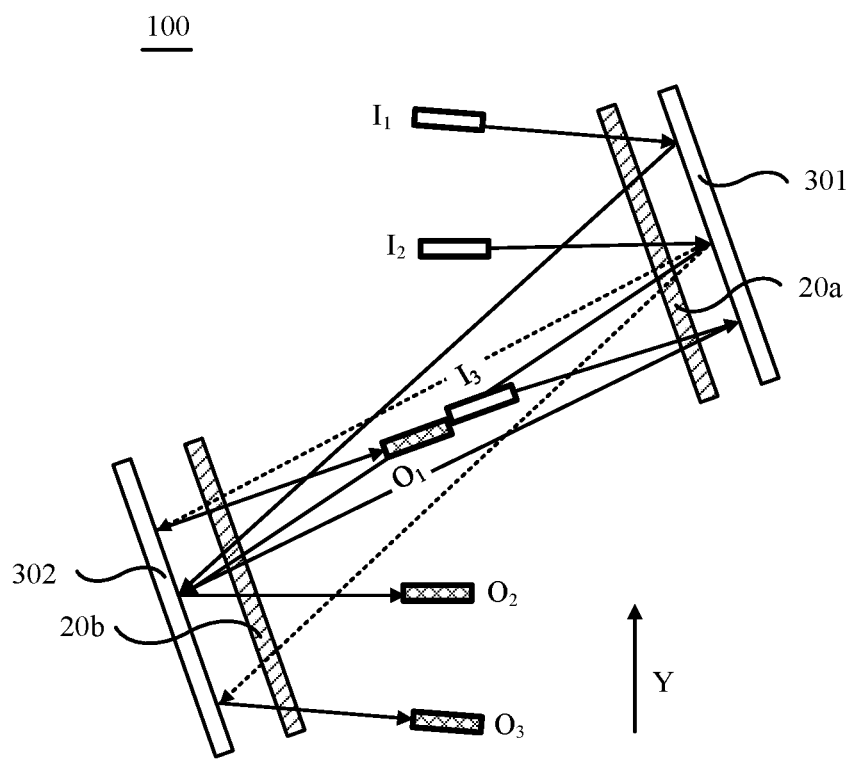
FIG. 14a is a schematic diagram of another structure of an optical selective switch according to an embodiment of this application.

An embodiment of this application provides another optical selective switch 100. As shown in FIG. 14a, the optical selective switch 100 may include N (for example, N=3) input ports ($I_1$, $I_2$, and $I_3$) and M (for example, M=3) output ports ($O_1$, $O_2$, and $O_3$), an input grating element 20a, an output grating element 20b, an input active deflection element 301, and an output active deflection element 401.

As described above, the N (for example, N=3) input ports ($I_1$, $I_2$, and $I_3$) are disposed side by side in a first direction Y Each input port is configured to receive one or more light beams as input light. In the first direction Y, at least one input port at a middle position in the N (for example, N=3) input ports ($I_1$, $I_2$, and $I_3$) may be an intermediate input port, for example, the intermediate input port $I_2$.

In addition, the M (for example, M=3) output ports ($O_1$, $O_2$, and $O_3$) may be disposed side by side in the first direction Y Each output port is configured to output to-be-output light from the output port. In the first direction Y, at least one output port at a middle position in the M (for example, M=3) output ports ($O_1$, $O_2$, and $O_3$) may be an intermediate output port, for example, the output port $O_3$.

After light output from the input ports ($I_1$, $I_2$, and $I_3$) passes through the input grating element 20a, the input grating element 20a may split input light from each input port into optical signals of different wavelengths based on a plurality of wavelength channels. In addition, the input active deflection element 301 may be a reflection-type diffraction grating shown in FIG. 14a, and may perform phase adjustment on input light from the input grating element 20a, deflect the input light to a direction corresponding to a target output port, and then reflect the input light to the output active deflection element 401. The output active deflection element 401 may also be a reflection-type diffraction grating, so that the output active deflection element 401 can perform phase adjustment on to-be-output light from the input active deflection element 301, deflect the to-be-output light to the target output port, and then reflect the to-be-output light to the output grating element 20b. The output grating element 20b may multiplex optical signals of one or more wavelengths to a same output port ($O_1$, $O_2$, or $O_3$).

Functions and structures of the input grating element 20a, the output grating element 20b, the input active deflection element 301, and the output active deflection element 401 are the same as those described above, and details are not described herein again.

Different from the optical selective switch 100 provided in the foregoing embodiment, no input passive deflection element 302 or output passive deflection element 402 needs to be disposed in the optical selective switch 100 shown in FIG. 14a. In addition, one end that is of at least one of the N input ports except the intermediate input port and that is on an inner side of the optical selective switch 100, that is, one end thereof close to the input grating element 20a, is deflected to a direction corresponding to the intermediate input port. For example, when N=3, ends of the input port $I_1$ and the input port $I_3$ close to the input grating element 20a are deflected to the direction corresponding to the intermediate input port $I_2$.

In addition, one end that is of at least one of the M output ports except the intermediate output port and that is on the inner side of the optical selective switch, that is, one end thereof close to the output grating element 20b, is deflected to a direction corresponding to the intermediate output port. For example, when M=3, ends of the output port $O_1$ and the output port $O_3$ close to the output grating element 20b are deflected to the direction corresponding to the intermediate output port $O_2$.

Figure 14B:
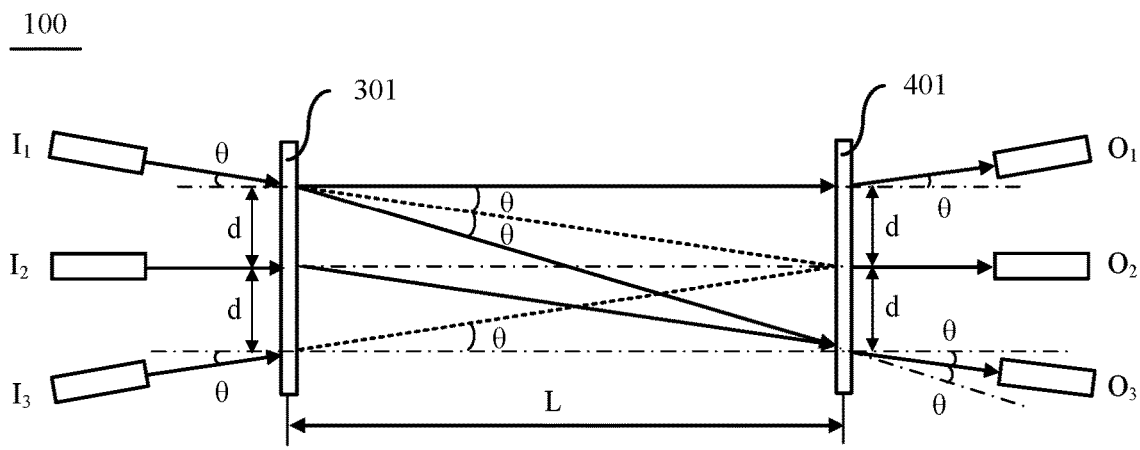

In some embodiments of this application, as shown in FIG. 14b, ends, of the input port $I_1$ and the input port $I_3$, that is, input ports in the N (for example, N=3) input ports ($I_1$, $I_2$, and $I_3$) except the intermediate input port $I_2$, close to the input grating element 20a are deflected to a direction corresponding to the intermediate input port $I_2$ by a first pretilt angle $\Delta\theta_1$.

For example, one end of the input port $I_1$ close to the input grating element 20a is deflected to the direction corresponding to the intermediate input port $I_2$ (downward) by the first pretilt angle $\Delta\theta_1$. One end of the input port $I_3$ close to the input grating element 20a is deflected to the direction corresponding to the intermediate input port $I_2$ (upward) by the first pretilt angle $\Delta\theta_1$.

In this case, when input light from the input port $I_1$ needs to be deflected to the output port $O_1$, the input active deflection element 301 may deflect the input light from the input port $I_1$ upward by the first pretilt angle $\Delta\theta_1$. In addition, when the input light from the input port $I_1$ needs to be deflected to the output port $O_3$, the input active deflection element 301 may deflect the input light from the input port $I_1$ downward by the first pretilt angle $\Delta\theta_1$. In this case, a maximum deflection angle of the input active deflection element 301 is the first pretilt angle $\Delta\theta_1$. Referring to the foregoing Formula (1) to Formula (3), a first pretilt angle $\Delta\theta_1$ of an input port may be calculated based on a sequence number of the input port. For example, first pretilt angles $\Delta\theta_1$ of the input port $I_1$ and the input port $I_3$ in FIG. 14b are $\theta$.

In this way, even if the input port $I_1$ and the output port $O_3$ are no longer in a same horizontal direction, angles at which the input active deflection element 301 deflects optical signals may all be the first pretilt angle $\Delta\theta_1$ ($\Delta\theta_1=\theta$). It can be learned from the foregoing description that, when $\theta$ is less than 10°, for example, approximately 5°, $\theta \approx d/L$. d is a distance between light spots formed when light beams from two adjacent input ports are both incident to the input active deflection element 301. L is a distance of optical signal transmission between the input active deflection element 301 and the output active deflection element 401.

In addition, when the input light from the input port $I_1$ needs to be deflected to the output port $O_3$, if the output active deflection element 401 does not perform any processing on light output from the input active deflection element 301, the light passing through the output active deflection element 401 is shown in FIG. 14b. The light continues to be transmitted downward along a dotted line, and therefore cannot reach the output port $O_3$. However, in this embodiment, one end of the output port $O_3$ close to the output grating element is deflected to the direction corresponding to the intermediate output port $O_2$ (upward) by a second pretilt angle $\Delta\theta_2$.

When the quantity N of input ports is the same as the quantity M of output ports, a first pretilt angle $\Delta\theta_1$ of the $k^{th}$ input port $I_k$ is equal to a second pretilt angle $\Delta\theta_2$ of the $k^{th}$ output port $O_k$. For example, second pretilt angles $\Delta\theta_2$ of the output port $O_1$ and the output port $O_3$ in FIG. 14*b* are $\theta$. In this case, the output active deflection element 401 only needs to deflect an optical signal from the input active deflection element 301 upward by $\theta$, to transmit the optical signal to the output port $O_3$. In this case, a maximum deflection angle of the output active deflection element 401 is $\theta$.

In this case, by deflecting some input ports and some output ports of the optical selective switch 100 to positions of the intermediate ports, angles at which the input active deflection element 301 and the output active deflection element 401 deflect incident optical signals can be reduced to increase energy of optical signals received by the output ports, thereby improving diffraction efficiency of the optical selective switch 100 during light beam deflection. In addition, because the angles at which the input active deflection element 301 and the output active deflection element 401 deflect the incident optical signals are reduced, an isolation between optical signals transmitted between different output ports can be increased.

On the other hand, when both the quantity N of input ports and the quantity M of output ports of the optical selective switch 100 are 3, maximum angles at which the input active deflection element 301 and the output active deflection element 401 deflect an input optical signal are both the angle $\theta$. Therefore, errors of optical signals received by different output ports are the same, and signal losses generated are also the same, thereby implementing balance between a port insertion loss and port crosstalk. In this way, an amplifier may be connected to an output end of the optical selective switch 100, and errors of optical signals output from different ports are compensated by using a same amplification factor.

It should be noted that, the foregoing description is provided by using an example in which both the quantity N of input ports and the quantity M of output ports are 3. When the quantity N of input ports and the quantity M of output ports change, a setting manner of an intermediate input port and an intermediate output port is the same as that described above.

In addition, when the quantity N of input ports is greater than 3, a first pretilt angle $\Delta\theta_1$ is gradually reduced in a direction from an input port at an edge to the intermediate input port. For example, when N=5, a first pretilt angle $\Delta\theta_1$ of the input port $I_1$ and a first pretilt angle $\Delta\theta_1$ of the input port $I_2$ are gradually reduced, and a first pretilt angle $\Delta\theta_1$ of the input port $I_5$ and a first pretilt angle $\Delta\theta_1$ of the input port $I_4$ are gradually reduced. When the quantity M of output ports is greater than 3, for example, when M=5, a deflection manner of output ports except the intermediate output port is the same as that described above, and details are not described herein again.

In addition, when the quantity N of input ports and the quantity M of output ports in the optical selective switch are different, the deflection manner of the output ports except the intermediate output port needs to be separately set based on the quantity M and positions of output ports. A deflection manner thereof may be similar to the deflection manner of the input ports except the intermediate input port, and details are not described herein again.

Figure 15:
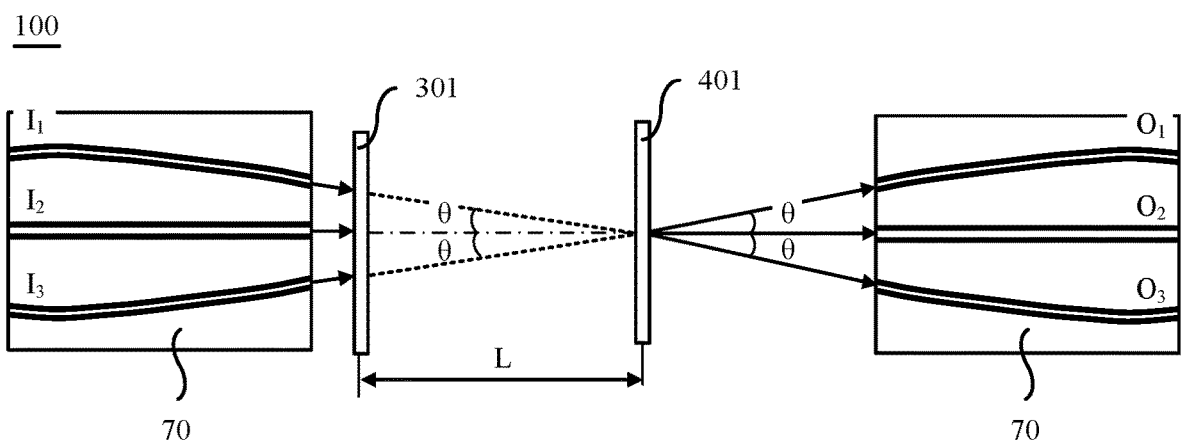
FIG. 15 is a schematic diagram of another structure of an optical selective switch according to an embodiment of this application.

On this basis, to form a deflected input port, for example, an input port $I_1$ and an input port $I_3$ shown in FIG. 15, and form a deflected output port, for example, an output port $O_1$ and an output port $O_3$, the input ports and the output ports may be optical fibers. The optical fiber may be made of a material that results in a low loss when an operating wavelength is used, for example, silicon on insulator (SOI), silicon nitride (SiN), $SiO_2$, and plastics.

In this case, in some embodiments of this application, an input port or an output port formed by an optical fiber having a specific deflection angle may be glued to a substrate 70 shown in FIG. 15. Alternatively, in some other embodiments of this application, a slot having a same deflection direction as the input port and the output port may be pre-made on the substrate shown in FIG. 15, and then the optical fiber is fastened in the slot, to arrange and fasten the optical fiber. The substrate 70 may be made of plastics, a silicon wafer, a ceramic plate, and the like.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An optical selective switch, comprising:
    N input ports, wherein each input port is configured to receive input light, and N is an integer greater than or equal to 3;
    M output ports, wherein each output port is configured to output to-be-output light from said each output port, and M is an integer greater than or equal to 3;
    an input passive deflection element, configured to deflect the input light to a direction corresponding to an intermediate output port;
    an input active deflection element, configured to deflect the input light to a direction corresponding to a target output port based on the deflection of the input passive deflection element;
    an output passive deflection element, configured to deflect the to-be-output light to the direction corresponding to the intermediate output port; and
    an output active deflection element, configured to deflect the to-be-output light to the target output port based on the deflection of the output passive deflection element, wherein
    the N input ports are disposed side by side in a first direction, the input passive deflection element comprises a plurality of first prism structures disposed side by side in the first direction, and at least one of the N input ports except an intermediate input port is in a one-to-one correspondence with the plurality of first prism structures; and
    a first prism structure of the plurality of first prism structures is configured to deflect the input light to the direction corresponding to the intermediate output port by a first pretilt angle $\Delta\theta_1$, and first pretilt angles $\Delta\theta_1$ of the plurality of first prism structures are reduced in the first direction from an edge of the input passive deflection element to its center.

2. The optical selective switch according to claim 1, wherein the first prism structure comprises a right-angled triangular prism, a cross section of the right-angled triangular prism in a direction perpendicular to a light incident surface of the input active deflection element is a right triangle, there is a wedge angle α between a hypotenuse of the right triangle and the light incident surface of the input active deflection element, and an opening direction of the wedge angle α faces toward the center of the input passive deflection element; and wedge angles α of the plurality of first prism structures are reduced in the first direction from the edge of the input passive deflection element to its center.

3. The optical selective switch according to claim 2, wherein when N is an even number, the first pretilt angle $\Delta\theta_1$ satisfies $$\Delta\theta_1 = \theta \times \left(\frac{N}{2} - k\right), \text{ and } 1 \leq k \leq \left(\frac{N}{2}\right);$$

or the first pretilt angle $\Delta\theta_1$ satisfies $$\Delta\theta_1 = \theta \times \left(k - \frac{N}{2} - 1\right), \text{ and } \left(\frac{N}{2} + 1\right) \leq k \leq N;$$

k is a sequence number of the $k^{th}$ input port of the N input ports, $$\theta \approx \frac{d}{L},$$

d is a distance between two adjacent input ports, and L is an optical path distance between the input passive deflection element and the output passive deflection element; and when N is an odd number, the first pretilt angle $\Delta\theta_1$ satisfies $$\Delta\theta_1 = \theta \times \left|\left(\frac{N+1}{2} - k\right)\right|.$$

4. The optical selective switch according to claim 3, wherein when N is an even number, the wedge angle α satisfies $$a \approx \frac{\theta \times \left|\frac{N}{2} - k\right|}{2(n-1)}, \text{ and } 1 \leq k \leq \left(\frac{N}{2}\right);$$

or the wedge angle α satisfies $$a \approx \frac{\theta \times \left|k - \frac{N}{2} - 1\right|}{2(n-1)}, \text{ and } \left(\frac{N}{2} + 1\right) \leq k \leq N,$$

wherein n is a refractive index of the first prism structure; and when N is an odd number, the wedge angle α satisfies $$a \approx \frac{\theta \times \left|\frac{N+1}{2} - k\right|}{2(n-1)}.$$

5. The optical selective switch according to claim 1, wherein the first prism structure comprises at least one dimming structure, and a range for performing phase modulation on an optical signal by using each dimming structure is 0-2π;

each dimming structure comprises a plurality of quadrangular prisms disposed side by side in the first direction, there are quadrangular prisms of Q height levels in each dimming structure in any prism structure, a quadrangular prism of each height level is configured to modulate a phase of an optical signal in the phase modulation range, 2≤Q, Q is an integer, and height change rates of the plurality of quadrangular prisms in the dimming structure of the first prism structure are gradually reduced in the first direction from the edge of the input passive deflection element to its center; and a height direction of the quadrangular prism is parallel to a direction perpendicular to a light incident surface of the input active deflection element, and a cross section of the quadrangular prism in the direction perpendicular to the light incident surface of the input active deflection element is a rectangle.

6. The optical selective switch according to claim 5, wherein quantities of quadrangular prisms in all the plurality of first prism structures are the same.

7. The optical selective switch of claim 5, wherein a length of any side of the rectangular is less than a minimum wavelength of the incident optical signal.

8. The optical selective switch according to claim 1, wherein the first prism structure comprises S metasurface structures disposed side by side in a second direction, the second direction intersects the first direction, and a range for performing phase modulation on an optical signal by using each metasurface structure is 0-2π;

all wavelength channels covered by the first prism structure in the second direction are classified into S bands, and each metasurface structure corresponds to one band, wherein S≥2, and S is an integer;

each metasurface structure comprises a plurality of nano-microcolumns arranged in an array, and a distance between two adjacent nano-microcolumns in the first direction is smaller than a center wavelength of a band corresponding to said each metasurface structure; and area change rates of cross sections of a plurality of nano-microcolumns in one row in one metasurface structure are reduced in the first direction from the edge of the input passive deflection element to its center, and the cross sections are parallel to a light incident surface of the input active deflection element.

9. The optical selective switch according to claim 8, wherein in the first direction, quantities of nano-microcolumns in a same row in all the metasurface structures are the same.

10. The optical selective switch according to claim 1, wherein the input light is a plurality of channels of light obtained through wavelength division multiplexing, and the optical selective switch further comprises:

an input grating element, configured to split the input light from each input port into optical signals of different wavelengths based on a plurality of wavelength channels of the input light; and an output grating element, configured to multiplex to-be-output light of one or more wavelengths to a same output port.

11. The optical selective switch according to claim 10, wherein the first prism structure covers, in a second direction, all wavelength channels of input light from an input port corresponding to the first prism structure, and the second direction intersects the first direction.

12. The optical selective switch according to claim 1, wherein
the M output ports are disposed side by side in the first direction, the output passive deflection element comprises a plurality of second prism structures disposed side by side in the first direction, and at least one of the M output ports except the intermediate output port is in a one-to-one correspondence with the second prism structures; and
the second prism structure is configured to deflect the to-be-output light to the direction corresponding to the intermediate output port by a second pretilt angle $\Delta\theta_2$, and second pretilt angles $\Delta\theta_2$ of the plurality of second prism structures are gradually reduced in the first direction from an edge of the output passive deflection element to its center.

13. The optical selective switch according to claim 12, wherein the quantity N of input ports is the same as the quantity M of output ports, and a first pretilt angle $\Delta\theta_1$ of a first prism structure corresponding to the $k^{th}$ input port is equal to a second pretilt angle $\Delta\theta_2$ of a second prism structure corresponding to the $k^{th}$ output port, wherein $1 \leq k \leq N$, and k is an integer.

14. The optical selective switch according to claim 1, wherein the input passive deflection element is disposed on a light incident surface of the input active deflection element; and
the optical selective switch further comprises an antireflective film, and the antireflective film is disposed on a side surface of the input passive deflection element close to the input active deflection element.

15. The optical selective switch according to claim 1, wherein the input passive deflection element is disposed on a light incident surface of the input active deflection element;
the input active deflection element is a liquid crystal on silicon panel, and the liquid crystal on silicon panel comprises a silicon substrate and a transparent cover plate that are disposed opposite to each other, and a liquid crystal layer located between the silicon substrate and the transparent cover plate; and
the first prism structure is disposed on a side surface of the transparent cover plate away from the silicon substrate.

16. The optical selective switch according to claim 1, wherein
when N is an odd number, at least the $((N+1)/2)^{th}$ input port of the N input ports is an intermediate input port; or when N is an even number, at least the $(N/2)^{th}$ input port and the $(N/2+1)^{th}$ input port of the N input ports are all intermediate input ports; and
when M is an odd number, at least the $((M+1)/2)^{th}$ output port of the M output ports is an intermediate output port; or when M is an even number, at least the $(M/2)^{th}$ output port and the $(M/2+1)^{th}$ output port of the M output ports are all intermediate output ports.

17. The optical selective switch according to claim 16, wherein
when $$\left| \frac{N+1}{2} - k \right| \leq \frac{N}{4},$$

the $k^{th}$ input port is an intermediate input port; or when $$\left| \frac{M+1}{2} - k \right| \leq \frac{M}{4},$$

the $k^{th}$ input port is an intermediate output port.

18. An optical selective switch, comprising:
N input ports, wherein each input port is configured to receive input light, N is an integer greater than or equal to 3, and one end that is of at least one of the N input ports except an intermediate input port and that is on an inner side of the optical selective switch is configured to deflect received input light to a direction corresponding to the intermediate input port;
M output ports, wherein each output port is configured to output to-be-output light from said each output port, M is an integer greater than or equal to 3, and one end that is of at least one of the M output ports except an intermediate output port and that is on the inner side of the optical selective switch is configured to deflect to-be-output light to a direction corresponding to the intermediate output port;
an input active deflection element, configured to deflect the input light to a direction corresponding to a target output port; and
an output active deflection element, configured to deflect the to-be-output light to the target output port, wherein
one end that is of at least one of the N input ports except the intermediate input port and that is on the inner side of the optical selective switch deflects the received input light to the direction corresponding to the intermediate input port by a first pretilt angle $\Delta\theta_1$, and the first pretilt angle $\Delta\theta_1$ is reduced in a direction from an input port at an edge to the intermediate input port; and
the quantity N of input ports is the same as the quantity M of output ports, and a first pretilt angle $\Delta\theta_1$ of the $k^{th}$ input port is equal to a second pretilt angle $\Delta\theta_2$ of the $k^{th}$ output port, wherein $1 \leq k \leq N$, and k is an integer.

* * * * *